(12) United States Patent
Kittichokechai et al.

(10) Patent No.: US 12,425,175 B2
(45) Date of Patent: Sep. 23, 2025

(54) CA LIMIT FOR DIFFERENT PDCCH MONITORING CAPABILITIES

(71) Applicant: Telefonaktiebolaget LM Ericsson (PUBL), Stockholm (SE)

(72) Inventors: Kittipong Kittichokechai, Järfälla (SE); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 383 days.

(21) Appl. No.: 17/798,800

(22) PCT Filed: Feb. 12, 2021

(86) PCT No.: PCT/IB2021/051210
§ 371 (c)(1),
(2) Date: Aug. 10, 2022

(87) PCT Pub. No.: WO2021/161266
PCT Pub. Date: Aug. 19, 2021

(65) Prior Publication Data
US 2023/0069404 A1    Mar. 2, 2023

Related U.S. Application Data

(60) Provisional application No. 62/976,756, filed on Feb. 14, 2020.

(51) Int. Cl.
*H04L 5/00* (2006.01)
*H04W 72/52* (2023.01)

(52) U.S. Cl.
CPC .......... *H04L 5/0096* (2013.01); *H04L 5/0053* (2013.01); *H04W 72/52* (2023.01)

(58) Field of Classification Search
None
See application file for complete search history.

(56) References Cited

FOREIGN PATENT DOCUMENTS

| CN | 102368871 A | 3/2012 |
|---|---|---|
| CN | 104737471 A | 6/2015 |
| CN | 110474737 A | 11/2019 |

(Continued)

OTHER PUBLICATIONS

3GPP TSG RAN WG1 Meeting #99; Reno, USA; Source: Huawei; Title: Summary #4 of 7.2.6.1 PDCCH enhancements (R1-1913541)—Nov. 18-22, 2019.

(Continued)

*Primary Examiner* — Angela Nguyen
(74) *Attorney, Agent, or Firm* — Baker Botts L.L.P.

(57) ABSTRACT

According to some embodiments, a wireless device is operating in communication with two or more serving cells wherein at least one serving cell of the two or more serving cells is configured for release 16 reporting of physical downlink control channel (PDCCH) monitoring capabilities. The wireless device performs a method comprising transmitting a first parameter representing a release 16 PDCCH monitoring capability of the wireless device to a network node and determining a maximum number of PDCCH candidates and a maximum number of non-overlapped control channel elements (CCEs) based on a maximum number of release 16 capable serving cells, which is determined based on the transmitted first parameter.

24 Claims, 11 Drawing Sheets

---

400

412 – transmit a first parameter representing a release 16 PDCCH monitoring capability of a wireless device to a network node

↓

414 – determine a maximum number of PDCCH candidates and a maximum number of non-overlapped CCEs based on a maximum number of release 16 capable serving cells, which is determined based on the transmitted first parameter

↓

416 – transmit a second parameter representing a release 15 PDCCH monitoring capability of a wireless device to the network node

↓

418 – determine a maximum number of PDCCH candidates and a maximum number of non-overlapped CCEs based on a maximum number of release 15 capable serving cells, which is determined based on the transmitted second parameter

(56) References Cited

FOREIGN PATENT DOCUMENTS

CN        110620645 A    12/2019
WO    WO2019215932 A1    11/2019

OTHER PUBLICATIONS

PCT International Search Report issued for International application No. PCT/IB2021/051210—May 3, 2021.
PCT Written Opinion of the International Searching Authority issued for International application No. PCT/IB2021/051210—May 3, 2021.
3GPP TS 38.213 v16.0.0; Technical Specification; 3rd Generation Partnership Project; Technical Specification Group Radio Access Network; NR; Physical layer procedures for control (Release 16)—Dec. 2019.
Office Action issued for Chinese Application Serial No. 202180028733.4—Nov. 15, 2023.
Search Report issued for Chinese Application Serial No. 2021800287334—Nov. 10, 2023.

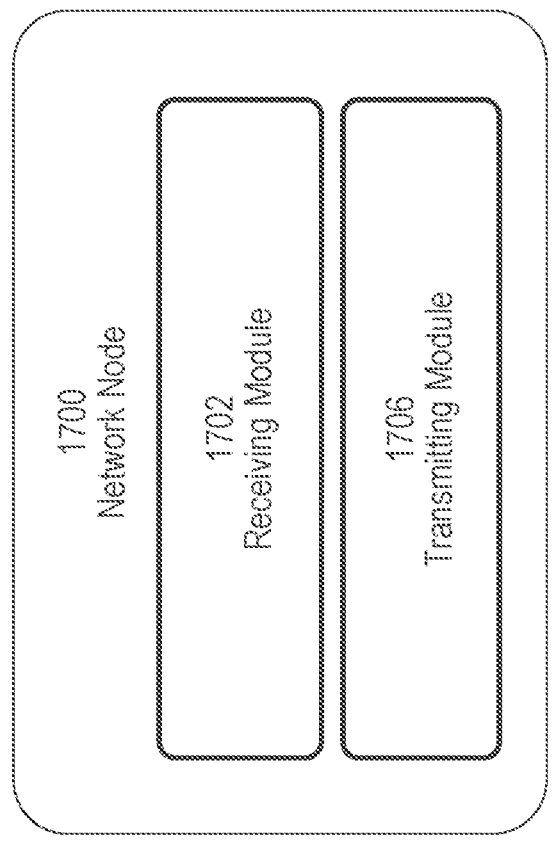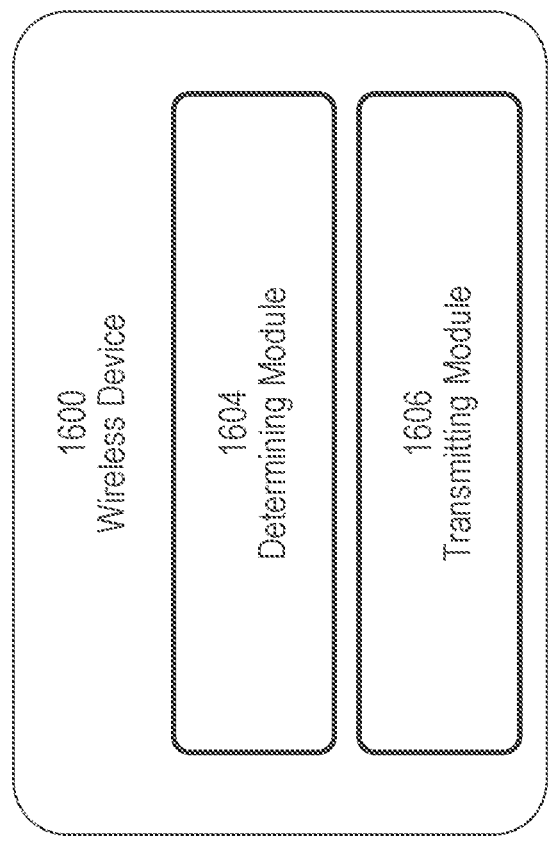
Fig. 6

CA LIMIT FOR DIFFERENT PDCCH MONITORING CAPABILITIES

PRIORITY

This nonprovisional application is a U.S. National Stage Filing under 35 U.S.C. § 371 of International Patent Application Serial No. PCT/IB2021/051210 filed Feb. 12, 2021 and entitled "CA LIMIT FOR DIFFERENT PDCCH MONITORING CAPABILITIES" which claims priority to U.S. Provisional Patent Application No. 62/976,756 filed Feb. 14, 2020 both of which are hereby incorporated by reference in their entirety.

TECHNICAL FIELD

Embodiments of the present disclosure are directed to wireless communications and, more particularly, to carrier aggregation (CA) limit for different physical downlink control channel (PDCCH) monitoring capabilities.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) new radio (NR) standard provides service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One solution for low latency data transmission is shorter transmission time intervals. In NR, in addition to transmission in a slot, a mini-slot transmission is also used to reduce latency. A mini-slot is a concept that is used in scheduling. In downlink a mini-slot can consist of 2, 4 or 7 orthogonal frequency division multiplexing (OFDM) symbols, while in uplink a mini-slot can be any number of 1 to 14 OFDM symbols. It should be noted that the concepts of slot and mini-slot are not specific to a specific service meaning that a mini-slot may be used for either eMBB, URLLC, or other services.

FIG. 1 is a time/frequency diagram illustrating an example radio resource in NR.

The horizontal axis represents time and the other axis represents frequency. Each resource element corresponds to one OFDM subcarrier during one OFDM symbol interval.

URLLC has strict requirements on transmission reliability and latency, i.e., 99.9999% reliability within 1 ms one-way latency. NR includes several new features to support these requirements and standardization work is focused on further enhancements. These include physical downlink control channel (PDCCH) enhancement to support increased PDCCH monitoring capability.

A control resource set (CORESET) is configured for a user equipment (UE) via higher layer parameters. This is described in more detail in TS 38.213, V16.0.0, section 10.1. As described in TS 38.213, for each downlink bandwidth part (BWP) configured to a UE in a serving cell, the UE can be provided by higher layer signaling with $P \leq 3$ CORESETs if CORESETPoolIndex is not provided, or if a value of CORESETPoolIndex is the same for all CORESETs if CORESETPoolIndex is provided, or with $P \leq 5$ CORESETs if CORESETPoolIndex is not provided for a first CORESET, or is provided and has a value 0 for a first CORESET, and is provided and has a value 1 for a second CORESET.

For each p CORESET, the UE is provided a ControlResourceSet that includes the following: (a) a CORESET index, by controlResourceSetId, where $0 \leq p < 12$ if CORESETPoolIndex is not provided, or if a value of CORESETPoolIndex is same for all CORESETs if CORESETPoolIndex is provided; (b) $0 < p < 16$ if CORESETPoolIndex is not provided for a first CORESET, or is provided and has a value 0 for a first CORESET, and is provided and has a value 1 for a second CORESET; (c) a demodulation reference signal (DM-RS) scrambling sequence initialization value by pdcch-DMRS-ScramblingID; (d) a precoder granularity for a number of resource element groups (REGs) in the frequency domain where the UE can assume use of a same DM-RS precoder by precoderGranularity, (e) a number of consecutive symbols provided by duration; (f) a set of resource blocks provided by frequencyDomainResources; (g) control channel element (CCE)-to-REG mapping parameters provided by cve-REG MappingType; (h) an antenna port quasi co-location, from a set of antenna port quasi co-locations provided by TCI-State, indicating quasi co-location information of the DM-RS antenna port for PDCCH reception in a respective CORESET; (i) if the UE is provided by simultaneousTCI-CellList a number of lists of cells for simultaneous transmission configuration indication (TCI) state activation, the UE applies the antenna port quasi co-location provided by TCI-States with same activated tci-StateID value to CORESETs with index p in all configured downlink BWPs of all configured cells in a list determined from a serving cell index provided by a medium access control (MAC) control element (CE) command; and (j) an indication for a presence or absence of a TCI field for a downlink control information (DCI) format, other than DCI format 1_0, that schedules physical downlink shared channel (PDSCH) receptions or indicates semi-persistent scheduling (SPS) PDSCH release and is transmitted by a PDCCH in p CORESET, by tci-PresentInDCI or tci-PresentInDCI-ForDCIFormat1_2.

PDCCH search space sets are configured for UE via higher layer parameters. The UE performs blind decoding for a set of PDCCH candidates configured in search space (SS) set. There can be up to 10 SS sets configured to a UE per downlink BWP. Each SS set is associated with a certain CORESET and provides a UE with PDCCH monitoring occasions, number of PDCCH candidates for each aggregation level (AL), SS type (common or UE-specific), and DCI formats to monitor.

For each downlink BWP configured to a UE in a serving cell, the UE is provided by higher layers with $S \leq 10$ search space sets where, for each search space set S from the search space sets, the UE is provided the following by SearchSpace: (a) a search space set index s, 0≤s<40, by searchSpaceId; (b) an association between the search space set s and a CORESET p by controlResourceSetId; (c) a PDCCH monitoring periodicity of k slots and a PDCCH monitoring offset of $O_s$ slots, by monitoringSlotPeriodicity-AndOffset; (d) a PDCCH monitoring pattern within a slot, indicating the first symbol(s) of the CORESET within a slot for PDCCH monitoring, by monitoringSymbolsWithinSlot; (e) a duration of Ts<ks slots indicating a number of slots that the search space set s exists by duration; (f) a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; and (g) an indication that search space set s is either a CSS set or a USS set by searchSpaceType.

If search space set s is a CSS set, then SearchSpace further includes: an indication by dci-Format0-0 AndFormat1-0 to monitor PDCCH candidates for DCI format 0_0 and DCI format 1_0; an indication by dci-Format2-0 to monitor one or two PDCCH candidates for DCI format 2_0 and a corresponding CCE aggregation level; an indication by dci-Format2-1 to monitor PDCCH candidates for DCI format 2_1; an indication by dci-Format2-2 to monitor PDCCH candidates for DCI format 2_2; an indication by dci-Format2-3 to monitor PDCCH candidates for DCI format 2_3; an indication by dci-Format2-4 to monitor PDCCH candidates for DCI format 2_4; and an indication by dci-Format2-6 to monitor PDCCH candidates for DCI format 2_6.

If search space set s is a USS set, an indication by dci-Formats to monitor PDCCH candidates either for DCI format 0_0 and DCI format 1_0, or for DCI format 0_1 and DCI format 1_1, or an indication by dci-Formats-Rel16 to monitor PDCCH candidates for DCI format 0_0 and DCI format 1_0, or for DCI format 0_2 and DCI format 1_2, or, if a UE indicates a corresponding capability, for DCI format 0_1, DCI format 1_1, DCI format 0_2, and DCI format 1_2, or for DCI format 3_0, or for DCI format 3_1, or for DCI format 3_0 and DCI format 3_1 PDCCH monitoring capability is described by the maximum number of blind decodes/monitored PDCCH candidates per slot or per span and the maximum number of non-overlapping CCEs for channel estimation per slot or per span. The limits per slot may be referred to as associated with Rel-15 PDCCH monitoring capability, while the limits per span may be referred to as associated with Rel-16 PDCCH monitoring capability.

The maximum numbers or limits are defined, e.g., in TS 38.213, V16.0.0 for a single serving cell as a function of subcarrier spacing values for the slot limit and a function of subcarrier spacing (SCS) and (X,Y) combination as shown in the tables below. The values for the span limits are examples and may change.

Table 10.1-2 provides the maximum number of monitored PDCCH candidates, $M_{PDCCH}^{max,slot,\mu}$, per slot for a UE in a DL BWP with SCS configuration $\mu$ for operation with a single serving cell.

TABLE 10.1-2

Maximum number $M_{PDCCH}^{max,\,slot,\,\mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max,\,slot,\,\mu}$ |
|---|---|
| 0 | 44 |
| 1 | 36 |
| 2 | 22 |
| 3 | 20 |

Table 10.1-2A provides the maximum number of monitored PDCCH candidates, $M_{PDCCH}^{max,(X,Y),\mu}$, per span for a UE in a DL BWP with SCS configuration $\mu$ for operation with a single serving cell.

TABLE 10.1-2A

Maximum number $M_{PDCCH}^{max,\,(X,\,Y),\,\mu}$ of monitored PDCCH candidates in a span of a span pattern (X, Y) for a DL BWP with SCS configuration $\mu \in \{0, 1\}$ for a single serving cell

| | Maximum number $M_{PDCCH}^{max,\,(X,\,Y),\,\mu}$ of monitored PDCCH candidates per span pattern (X, Y) and per serving cell | | |
|---|---|---|---|
| $\mu$ | (2, 2) | (4, 3) | (7, 3) |
| 0 | M01 | M02 | M03 |
| 1 | M11 | M12 | M13 |

Table 10.1-3 provides the maximum number of non-overlapped CCEs, $C_{PDCCH}^{max,slot,\mu}$, for a DL BWP with SCS configuration $\mu$ that a UE is expected to monitor corresponding PDCCH candidates per slot for operation with a single serving cell. CCEs for PDCCH candidates are non-overlapped if they correspond to different CORESET indexes, or different first symbols for the reception of the respective PDCCH candidates.

TABLE 10.1-3

Maximum number $C_{PDCCH}^{max,\,slot,\,\mu}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C_{PDCCH}^{max,\,slot,\,\mu}$ |
|---|---|
| 0 | 56 |
| 1 | 56 |
| 2 | 48 |
| 3 | 32 |

Table 10.1-3A provides the maximum number of non-overlapped CCEs, $C_{PDCCH}^{max,(X,Y),\mu}$, for a DL BWP with SCS configuration $\mu$ that a UE is expected to monitor corresponding PDCCH candidates per span for operation with a single serving cell.

TABLE 10.1-3A

Maximum number $C_{PDCCH}^{max,\ (X,\ Y),\ \mu}$ of non-overlapped CCEs in a span of a span pattern (X, Y) for a DL BWP with SCS configuration $\mu \in \{0, 1\}$ for a single serving cell Maximum number $C_{PDCCH}^{max,\ (X,\ Y),\ \mu}$ of non-overlapped CCEs per span pattern (X, Y) and per serving cell

| $\mu$ | (2, 2) | (4, 3) | (7, 3) |
|---|---|---|---|
| 0 | C01 | C02 | 56 |
| 1 | C11 | C12 | 56 |

A UE can indicate a capability to monitor PDCCH according to one or more of the span patterns (2, 2), (4, 3), and (7, 3) per SCS configuration of $\mu=0$ and $\mu=1$. If the UE indicates a capability to monitor PDCCH according to multiple span patterns and a configuration of search space sets to the UE results to a separation of two PDCCH monitoring occasions in two respective consecutive span patterns that is equal to or larger than the value of X for two or more of the multiple span patterns, the UE is expected to monitor PDCCH according to the span pattern associated with the largest maximum number of $C_{PDCCH}^{max,(X,Y),\mu}$.

PDCCH monitoring capability also applies for multi-TRP and carrier aggregation. For example, UE capability for multi-TRP operation in NR at least for PDCCH monitoring capability is based on the CA capability. Below is a short description of parameters associated with configured serving cells for two TRPs and UE capability for the number of monitored serving cells.

The UE reported capability in case of multi-TRP using CA framework:

$N_{cells,0}^{DL,\mu}$: the number of configured serving cells for the first set associated with the first TRP.

$N_{cells,1}^{DL,\mu}$: the number of configured serving cells for the second set associated with the second TRP.

R: a value reported by the UE or a default value defined in the specification for the purpose of reporting UE capability for the number of monitored serving cells $N_{cells,0}^{DL,\mu}+R\cdot N_{cells,1}^{DL,\mu}$: the derived number of serving cells that UE may report as its capability Configured number of serving cells in case of multi-TRP using CA framework:

BDFactorR, $\gamma$: a value configured to a UE $N_{cells,0}^{DL,\mu}+\gamma N_{cells,1}^{DL,\mu}$: the derived number of configured serving cells TS 38.213, V16.0.0, Section 10 includes the following description. If a UE can support a first set of $N_{cells,0}^{DL}$ serving cells where the UE is either not provided CORESETPoolIndex or is provided CORESETPoolIndex with a single value for all CORESETs on all DL BWPs of each serving cell from the first set of serving cells, and a second set of $N_{cells,1}^{DL}$ serving cells where the UE is provided CORESETPoolIndex with a value 0 for a first CORESET and with a value 1 for a second CORESET on any DL BWP of each serving cell from the second set of serving cells, then the UE determines, for the purpose of reporting pdcch-BlindDetectionCA, a number of serving cells as $N_{cells,0}^{DL}+R\cdot N_{cells,1}^{DL}$ where R is either a value reported by the UE or R=TBD if the UE does not report a value of R.

If a UE indicates in UE-NR-Capability a carrier aggregation capability larger than 4 serving cells and the UE is not provided PDCCHMonitoringCapabilityConfig for any downlink cell or if the UE is provided PDCCHMonitoringCapabilityConfig=R15 PDCCH monitoring capability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R\cdot N_{cells,1}^{DL}$ if the UE does not provide pdcch-BlindDetectionCA where $N_{cells,0}^{DL}+N_{cells,1}^{DL}$ is the number of configured downlink serving cells, otherwise, is the value of pdcch-BlindDetectionCA.

For carrier aggregation, a UE can report its PDCCH monitoring capability in different ways. Case 1 below corresponds to the case where the UE reports the number of component carriers (CC) all with Rel-15 monitoring capability (per-slot limit). Case 2 corresponds to the case where the UE reports the number of component carriers (CC) all with Rel-16 monitoring capability (per-span limit). Case 3 corresponds to the case where the UE reports both the number of component carriers (CC) with Rel-15 and Rel-16 monitoring capability on different serving cells.

A UE reports its PDCCH monitoring capability for the following cases:

Case 1: Capability on the number of CCs with Rel-15 monitoring capability only. This capability already exists in Rel-15.

Case 2: Capability on the number of CCs with Rel-16 monitoring capability only; pdcch-BlindDetectionCA-R16 can be smaller than 4.

Case 3: Capability on the number of CCs with Rel-15 monitoring capability and Rel-16 monitoring capability on different serving cells; pdcch-BlindDetectionCA-R15 for Rel-15 PDCCH monitoring capability; pdcch-BlindDetectionCA-R16 for Rel-16 PDCCH monitoring capability. Each of pdcch-BlindDetectionCA-R16 and pdcch-BlindDetectionCA-R15 can be smaller than 4. The minimum of pdcch-BlindDetectionCA-R15+the minimum of pdcch-BlindDetectionCA-R16 is not larger than 4. The minimum of pdcch-BlindDetectionCA-R15+the minimum of pdcch-BlindDetectionCA-R16 may be smaller than 4.

The pdcch-BlindDetectionCA-R15 and pdcch-BlindDetectionCA-R16 for the above three cases can be reported separately.

Case 1 is the same as the existing Rel-15 capability. For Case 2 and Case 3, the above description is captured in the specification TS 38.213, V16.0.0, in Section 10 as shown below.

If a UE indicates in UE-NR-Capability-r16 a carrier aggregation capability larger than X downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than X downlink cells. When a UE is not configured for NR-DC operation and the UE is provided PDCCHMonitoringCapabilityConfig=R16 PDCCH monitoring capability for all downlink cell where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is the number of configured downlink cells if the UE does not provide pdcch-BlindDetectionCA-r16, otherwise, $N_{cells}^{cap-r16}$ is the value of pdcch-BlindDetectionCA-r16.

If a UE indicates in UE-NR-Capability-r15 or in UE-NR-Capability-r16 a carrier aggregation capability larger than Y downlink cells or larger than Z downlink cells, respectively, the UE includes in UE-NR-Capability-r15 or in UE-NR-Capability-r16 an indication for a maximum number of PDCCH candidates and a maximum number of non-overlapped CCEs the UE can monitor for downlink cells with PDCCHMonitoringCapabilityConfig=R15 PDCCH monitoring capability or for downlink cells with PDCCHMonitoringCapabilityConfig=R16 PDCCH monitoring capability when the UE is configured for carrier aggregation operation over more than Y downlink cells or over more than Z downlink cells, respectively, and with at least one downlink cells from the Y downlink cells and at least one downlink cell from the Z downlink cells. When a UE is not configured for NR-DC operation, the UE determines a capability to monitor a maximum number of PDCCH candidates and a maximum number of non-overlapped CCEs per slot or per span that corresponds to $N_{cells,r15}^{cap\text{-}r16}$ downlink cells or to $N_{cells,r16}^{cap\text{-}r16}$ downlink cells, respectively, where $N_{cells,r15}^{cap\text{-}r16}$ is the number of configured downlink cells if the UE does not provide pdcch-BlindDetectionCA-r15, otherwise, $N_{cells,r15}^{cap\text{-}r16}$ is the value of pdcch-BlindDetectionCA-r15 and $N_{cells,r16}^{cap\text{-}r16}$ is the number of configured downlink cells if the UE does not provide pdcch-BlindDetectionCA-r16, otherwise, $N_{cells,r16}^{cap\text{-}r16}$ is the value of pdcch-BlindDetectionCA-r16.

PDCCH monitoring capabilities defined in the previous section can be referred to as a per-component carrier (CC) or single-serving cell limit. For the case of carrier aggregation (CA), the CA-capability is determined based on the UE reported limit (e.g., the number of serving cells it is capable of monitoring) and the number of configured serving cells.

If the UE is capable of monitoring a greater number of cells than what it is configured for, the CA capability per cell corresponds to the per-CC limit defined in the previous section.

However, if the UE report its CA-limit which is lower than the number of configured serving cells, the CA-limit is applied by proportionally scaling down the value derived based on the number of configured serving cells.

PDCCH monitoring capability for the CA case described in TS 38.213, V16.0.0. If a UE does not report pdcch-BlindDetectionCA or is not provided BDFactorR, γ=R, and reports pdcch-BlindDetectionCA, the UE can be indicated by BDFactorR either γ=1 or γ=R.

If a UE is configured with $N_{cells,0}^{DL,\mu}+N_{cells,1}^{DL,\mu}$ downlink cells with active DL BWPs using SCS configuration μ where $\Sigma_{\mu=0}^{3}(N_{cells,0}^{DL,\mu}+\gamma \cdot N_{cells,1}^{DL,\mu}) \leq N_{cells}^{cap}$, the UE is not required to monitor, on the active DL BWP of the scheduling cell, more than $M_{PDCCH}^{total,slot,\mu}=M_{PDCCH}^{max,slot,\mu}$ PDCCH candidates or more than $C_{PDCCH}^{total,slot,\mu}=C_{PDCCH}^{max,slot,\mu}$ non-overlapped CCEs per slot for each scheduled cell when the scheduling cell is from the $N_{cells,0}^{DL,\mu}$ downlink cells, or more than $M_{PDCCH}^{total,slot,\mu}=\gamma \cdot M_{PDCCH}^{max,slot,\mu}$ a PDCCH candidates or more than $C_{PDCCH}^{total,slot,\mu}=\gamma \cdot C_{PDCCH}^{max,slot,\mu}$ non-overlapped CCEs per slot for each scheduled cell when the scheduling cell is from the $N_{cells,1}^{DL,\mu}$ downlink cells, or more than $M_{PDCCH}^{max,slot,\mu}$ PDCCH candidates or more than $C_{PDCCH}^{max,slot,\mu}$ a non-overlapped CCEs per slot for CORESETs with same CORESETPoolIndex value for each scheduled cell when the scheduling cell is from the $N_{cells,1}^{DL,\mu}$ downlink cells.

If a UE is configured with $N_{cells,0}^{DL,\mu}+N_{cells,1}^{DL,\mu}$ downlink cells with active DL BWPs using SCS configuration μ, where $\Sigma_{\mu=0}^{3}(N_{cells,0}^{DL,\mu}+\gamma \cdot N_{cells,1}^{DL,\mu}) > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu}=\lfloor N_{cells}^{cap} \cdot M_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ PDCCH candidates or more than $C_{PDCCH}^{total,slot,\mu}=\lfloor N_{cells}^{cap} \cdot C_{PDCCH}^{max,slot,\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ non-overlapped CCEs per slot on the active DL BWP(s) of scheduling cell(s) from the $N_{cells,0}^{DL}+N_{cells,1}^{DL}$ downlink cells.

For each scheduled cell, the UE is not required to monitor on the active DL BWP with SCS configuration μ of the scheduling cell from the $N_{cells,0}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

For each scheduled cell, the UE is not required to monitor on the active DL BWP with SCS configuration μ of the scheduling cell from the $N_{cells,1}^{DL,\mu}$ downlink cells more than $\min(\gamma \cdot M_{PDCCH}^{max,slot,\mu}, M_{PDCCH}^{total,slot,\mu})$ PDCCH candidates or more than $\min(\gamma \cdot C_{PDCCH}^{max,slot,\mu}, C_{PDCCH}^{total,slot,\mu})$ non-overlapped CCEs per slot, or more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value.

There currently exist certain challenges. For example, the current version of the NR specifications only describe a solution for determining PDCCH monitoring capability for the CA case when the UE is configured to monitor PDCCH with Rel-15 PDCCH monitoring capability (blind detection and CCE limits per slot) for all serving cells. PDCCH monitoring capabilities for CA when the UE reports its monitoring capability and is configured to monitor PDCCH with Rel-16 PDCCH monitoring capability (blind detection and CCE limits per span) for all serving cells, and when the UE reports its monitoring capability and is configured to monitor PDCCH with both Rel-15 and Rel-16 PDCCH monitoring capability for different serving cells are unknown.

SUMMARY

Based on the description above, certain challenges currently exist with physical downlink control channel (PDCCH) monitoring capability for carrier aggregation (CA). Certain aspects of the present disclosure and their embodiments may provide solutions to these or other challenges.

Particular embodiments determine the CA capability when a user equipment (UE) is configured with PDCCH monitoring capability according to Rel-16 monitoring capability for all serving cells or with both Rel-15 and Rel-16 monitoring capability for different serving cells. In some embodiments, a UE operates with multi-transmission reception point (TRP) using the CA framework and the UE separately reports its capability for Rel-15 and Rel-16 PDCCH monitoring.

According to some embodiments, a wireless device is operating in communication with two or more serving cells wherein at least one serving cell of the two or more serving cells is configured for release 16 reporting of PDCCH monitoring capabilities. The wireless device performs a method comprising transmitting a first parameter representing a release 16 PDCCH monitoring capability of the wireless device to a network node and determining a maximum number of PDCCH candidates and a maximum number of non-overlapped control channel elements (CCEs) based on a maximum number of release 16 capable serving cells, which is determined based on the transmitted first parameter.

In particular embodiments, the transmitted first parameter comprises the maximum number of release 16 capable serving cells. In other embodiments, the two or more serving cells comprise a first subset of serving cells and a second subset of serving cells, the first transmitted parameter comprises a first ratio, and the maximum number of release 16 capable serving cells equals a number of serving cells in the first subset combined with a number of serving cells in the second subset scaled by the first ratio.

In particular embodiments, the first subset of serving cells comprises serving cells where the wireless device is either not provided a control resource set (CORESET) pool index or is provided a CORESET pool index with a single value for all CORESETs on all downlink bandwidth parts of each serving cell in the first subset of serving cells, and the second subset of serving cells comprises serving cells where the wireless device is provided a CORESET pool index with a value 0 for a first CORESET and with a value 1 for a second CORESET on any downlink bandwidth part of each serving cell from the second subset of serving cells.

In particular embodiments, all of the two or more serving cells are configured for release 16 reporting of monitoring capabilities, and wherein determining the maximum number of PDCCH candidates and the maximum number of non-overlapped CCEs is based on comparing a total number of the two or more serving cells with the maximum number of release 16 capable serving cells.

In particular embodiments, the total number of the two or more serving cells is less than or equal to the maximum number of release 16 capable serving cells and the maximum number of PDCCH candidates and the maximum number of non-overlapped CCEs is the same as a single serving cell limit per span for each of the two or more serving cells.

In particular embodiments, the total number of the two or more serving cells is less than or equal to the maximum number of release 16 capable serving cells and the maximum number of PDCCH candidates and the maximum number of non-overlapped CCEs is based on a single serving cell limit per span for each of the two or more serving cells.

In particular embodiments, the total number of the two or more serving cells is greater than the maximum number of release 16 capable serving cells and the maximum number of PDCCH candidates and the maximum number of non-overlapped CCEs is based on a single serving cell limit per span for each of the two or more serving cells.

In particular embodiments, the total number of the two or more serving cells is modified based on the first parameter.

In particular embodiments, at least one serving cell of the two or more serving cells is configured for release 15 reporting of monitoring capabilities and the method further comprises: transmitting a second parameter representing a release 15 PDCCH monitoring capability of the wireless device to the network node; and determining a maximum number of PDCCH candidates and a maximum number of non-overlapped CCEs based on a maximum number of release 15 capable serving cells, which is determined based on the transmitted second parameter.

In particular embodiments, the transmitted second parameter comprises the maximum number of release 15 capable serving cells. In other embodiments, the two or more serving cells comprise a first subset of serving cells and a second subset of serving cells; the second transmitted parameter comprises a second ratio; and the maximum number of release 15 capable serving cells equals a number of serving cells in the first subset combined with a number of serving cells in the second subset scaled by the second ratio.

In particular embodiments, determining the maximum number of PDCCH candidates and the maximum number of non-overlapped CCEs for release 16 capable cells is based on comparing a total number of the two or more serving cells configured for release 16 reporting with the maximum number of release 16 capable serving cells and determining the maximum number of PDCCH candidates and the maximum number of non-overlapped CCEs for release 15 capable cells is based on comparing a total number of the two or more serving cells configured for release 15 reporting with the maximum number of release 15 capable serving cells.

In particular embodiments, the first subset of serving cells includes all release 16 capable cells or all release 15 capable cells and the second subset of serving cells includes all release 16 capable cells or all release 15 capable cells.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a network node is capable of receiving PDCCH monitoring capabilities of a wireless device, wherein the wireless device is operating in communication with two or more serving cells and wherein at least one serving cell of the two or more serving cells is configured for release 16 reporting of monitoring capabilities. The network node performs a method comprising: receiving a first parameter representing a release 16 PDCCH monitoring capability of the wireless device; and determining a maximum number of PDCCH candidates and a maximum number of non-overlapped CCEs based on a maximum number of release 16 capable serving cells, which is determined based on the transmitted first parameter.

In particular embodiments, the received first parameter comprises the maximum number of release 16 capable serving cells. In some embodiments, the two or more serving cells comprise a first subset of serving cells and a second subset of serving cells; the first received parameter comprises a first ratio; and the maximum number of release 16 capable serving cells equals a number of serving cells in the first subset combined with a number of serving cells in the second subset scaled by the first ratio.

In particular embodiments, the first subset of serving cells comprises serving cells where the wireless device is either not provided a control resource set (CORESET) pool index or is provided a CORESET pool index with a single value for all CORESETs on all downlink bandwidth parts of each serving cell in the first subset of serving cells, and the second subset of serving cells comprises serving cells where the wireless device is provided a CORESET pool index with a value 0 for a first CORESET and with a value 1 for a second CORESET on any downlink bandwidth part of each serving cell from the second subset of serving cells.

In particular embodiments, all of the two or more serving cells are configured for release 16 reporting of monitoring capabilities, and wherein determining the maximum number of PDCCH candidates and the maximum number of non-overlapped CCEs is based on comparing a total number of the two or more serving cells with the maximum number of release 16 capable serving cells.

In particular embodiments, the total number of the two or more serving cells is less than or equal to the maximum number of release 16 capable serving cells and the maximum number of PDCCH candidates and the maximum number of non-overlapped CCEs is the same as a single serving cell limit per span for each of the two or more serving cells.

In particular embodiments, the total number of the two or more serving cells is less than or equal to the maximum number of release 16 capable serving cells and the maximum number of PDCCH candidates and the maximum number of non-overlapped CCEs is based on a single serving cell limit per span for each of the two or more serving cells.

In particular embodiments, the total number of the two or more serving cells is greater than the maximum number of release 16 capable serving cells and the maximum number of PDCCH candidates and the maximum number of non-overlapped CCEs is based on a single serving cell limit per span for each of the two or more serving cells.

In particular embodiments, at least one serving cell of the two or more serving cells is configured for release 15 reporting of monitoring capabilities, and the method further comprises: receiving a second parameter representing a release 15 PDCCH monitoring capability of the wireless device to the network node; and determining a maximum number of PDCCH candidates and a maximum number of non-overlapped CCEs based on a maximum number of release 15 capable serving cells, which is determined based on the transmitted second parameter.

In particular embodiments, the received second parameter comprises the maximum number of release 15 capable serving cells. In some embodiments, the two or more serving cells comprise a first subset of serving cells and a second subset of serving cells; the second received parameter comprises a second ratio; and the maximum number of release 15 capable serving cells equals a number of serving cells in the first subset combined with a number of serving cells in the second subset scaled by the second ratio.

In particular embodiments, determining the maximum number of PDCCH candidates and the maximum number of non-overlapped CCEs for release 16 capable cells is based on comparing a total number of the two or more serving cells configured for release 16 reporting with the maximum number of release 16 capable serving cells and determining the maximum number of PDCCH candidates and the maximum number of non-overlapped CCEs for release 15 capable cells is based on comparing a total number of the two or more serving cells configured for release 15 reporting with the maximum number of release 15 capable serving cells.

In particular embodiments, the first subset of serving cells includes all release 16 capable cells or all release 15 capable cells and the second subset of serving cells includes all release 16 capable cells or all release 15 capable cells.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments provide a complete and unified solution for determining the CA capability for UE configured with Rel-16 monitoring capability for all serving cells or with both Rel-15 and Rel-16 monitoring capability for different serving cells.

BRIEF DESCRIPTION OF THE DRAWINGS

For a more complete understanding of the disclosed embodiments and their features and advantages, reference is now made to the following description, taken in conjunction with the accompanying drawings, in which:

FIG. 6 illustrates a schematic block diagram of a wireless device and a network node in a wireless network, according to certain embodiments;

DETAILED DESCRIPTION

Figure 1:
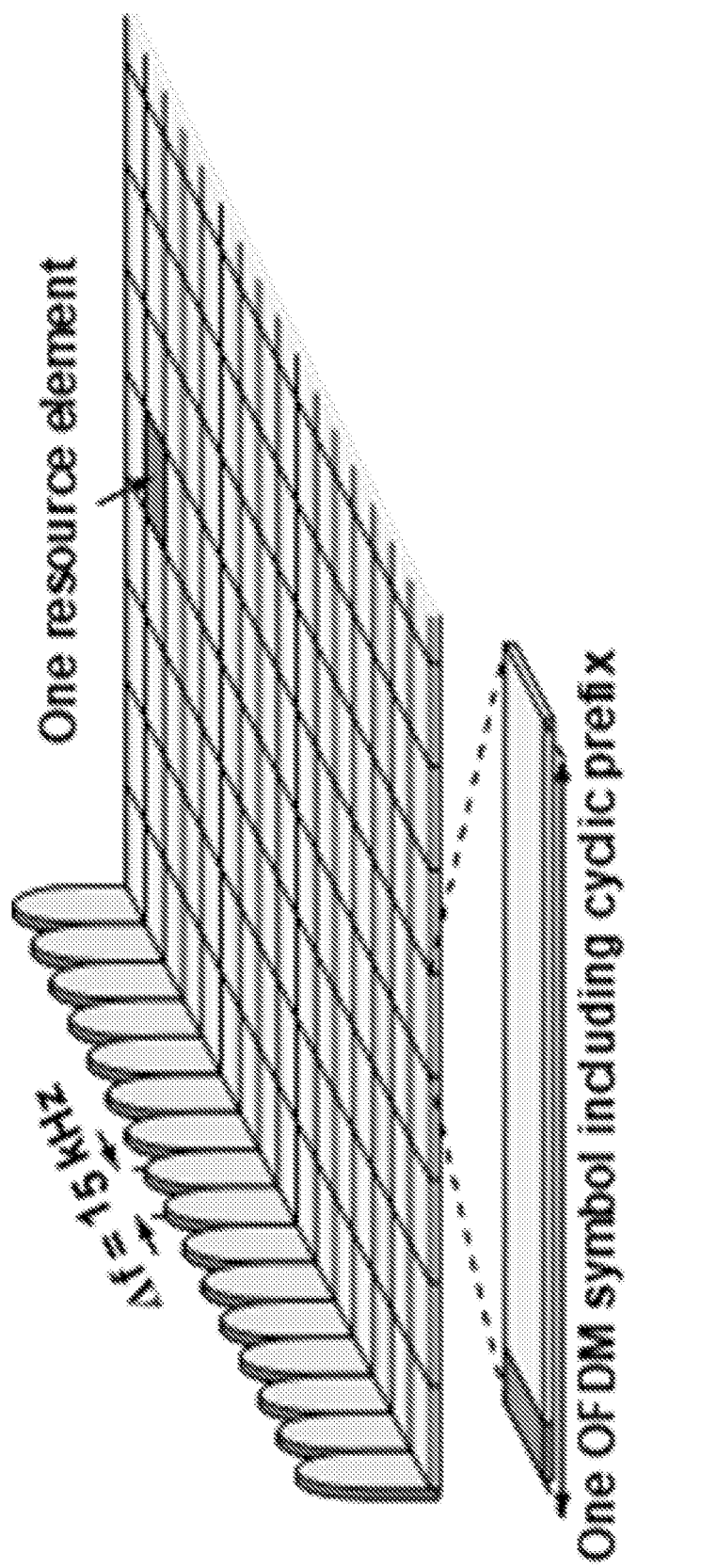
FIG. 1 is a time/frequency diagram illustrating an example radio resource in new radio (NR)

As described above, certain challenges currently exist with physical downlink control channel (PDCCH) monitoring capability for carrier aggregation (CA). Certain aspects of the present disclosure and their embodiments may provide solutions to these or other challenges. Particular embodiments determine the CA capability when a user equipment (UE) is configured with PDCCH monitoring capability according to Rel-16 monitoring capability for all serving cells or with both Rel-15 and Rel-16 monitoring capability for different serving cells. In some embodiments, a UE operates with multi-transmission reception point (TRP) using the CA framework and the UE separately reports its capability for Rel-15 and Rel-16 PDCCH monitoring.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a UE reports its capability for multi-TRP using CA framework for Rel-16 monitoring capability. The UE may report the number of component carriers (CC) all with Rel-16 monitoring capability (per-span limit).

When a UE is not configured for new radio dual connectivity (NR-DC) operation and the UE is provided PDCCHMonitoringCapabilityConfig=R16 PDCCH monitoring capability for all downlink cell where the UE monitors PDCCH, the UE determines a capability to monitor a maximum number of PDCCH candidates and a maximum number of non-overlapped control channel elements (CCEs) per span that corresponds to $N_{cells}^{cap-r16}$ downlink cells.

In some embodiments, the UE determines a capability to monitor a maximum number of PDCCH candidates and a maximum number of non-overlapped CCEs per span that corresponds to $N_{cells}^{cap-r16} = N_{cells,0}^{DL,\mu} + R\_rel16 \cdot N_{cells,1}^{DL}$ downlink cells if the UE does not provide pdcch-BlindDetectionCA-r16, where $N_{cells,0}^{DL}$ is the number of cells in the first group and $N_{cells,1}^{DL}$ is the number of cells in the second group where $N_{cells,0}^{DL} + N_{cells,1}^{DL}$ is the number of configured downlink serving cells, otherwise, $N_{cells}^{cap-r16}$ is the value of pdcch-BlindDetectionCA-r16.

In some embodiments, the parameter R_rel16 is separately reported by the UE (i.e., separate from the parameter R used to determine $N_{cells}^{cap} = N_{cells,0}^{DL} + R \cdot N_{cells,1}^{DL}$ when UE is provided PDCCHMonitoringCapabilityConfig=R15 PDCCH monitoring capability for all downlink cells).

In some embodiments, the parameter R_rel16 is equal to R used to determine $N_{cells}^{cap} = N_{cells,0}^{DL} + R \cdot N_{cells,1}^{DL}$ when UE is provided PDCCHMonitoringCapabilityConfig=R15 PDCCH monitoring capability. That is, a single value R is reported by the UE regardless of whether UE is provided with PDCCHMonitoringCapabilityConfig=R15 PDCCH monitoring capability for all downlink cells or PDCCHMonitoringCapabilityConfig=R16 PDCCH monitoring capability for all downlink cells.

In some embodiments, the parameter R_rel16 is defined with a default value in the specification and is used if UE does not report a value of R_rel16.

The radio resource control (RRC) parameter pdcch-BlindDetectionCA-r16 is optionally reported by the UE to the gNB, to indicate the number of component carriers the UE is capable of performing with Rel-16 monitoring span-based PDCCH monitoring. The value of pdcch-BlindDetectionCA-r16 may be larger than or equal to the number of carriers configured to the UE with Rel-16 PDCCH monitoring capability.

In some embodiments, a UE reports both the number of component carriers (CC) with Rel-15 and Rel-16 monitoring capability on different serving cells. When a UE is not configured for NR-DC operation and the UE is provided PDCCHMonitoringCapabilityConfig=R15 PDCCH monitoring capability for some downlink cell and PDCCHMonitoringCapabilityConfig=R16 PDCCH monitoring capability for some downlink cell, the UE determines a capability to monitor a maximum number of PDCCH candidates and a maximum number of non-overlapped CCEs per slot or per span that corresponds to $N_{cells,r15}^{cap-r16}$ is downlink cells or to $N_{cells,r16}^{cap-r16}$ downlink cells, respectively.

In some embodiments, the UE determines a capability to monitor a maximum number (M) of PDCCH candidates and a maximum number (C) of non-overlapped CCEs per slot that corresponds to $N_{cells,r15}^{cap-r16} = N_{cells,0,r15}^{DL} + R\_rel15 \cdot N_{cells,0,r15}^{DL}$ downlink cells if the UE does not provide pdcch-BlindDetectionCA-r15, where $N_{cells,0,r15}^{DL}$ is the number of cells in the first group with Rel-15 monitoring capability and $N_{cells,1,r15}^{DL}$ is the number of cells in the second group with Rel-15 monitoring capability where $N_{cells,0,r15}^{DL} + N_{cells,1,r15}^{DL}$ is the number of configured downlink serving cells with Rel-15 PDCCH monitoring capability (per-slot limit), otherwise, $N_{cells,r15}^{cap-r16}$ is the value of pdcch-BlindDetectionCA-r15.

The per-slot limits M and C are applied among the component carriers designated with Rel-15 PDCCH monitoring capability.

In some embodiments, the UE determines a capability to monitor a maximum number (M) of PDCCH candidates and a maximum number (C) of non-overlapped CCEs per span that corresponds to $N_{cells,r16}^{cap-r16} = N_{cells,0,r16}^{DL} + R\_rel16 \cdot N_{cells,1,r16}^{DL}$ downlink cells if the UE does not provide pdcch-BlindDetectionCA-r16, where $N_{cells,0,r16}^{DL}$ is the number of cells in the first group with Rel-16 monitoring capability and $N_{cells,1,r16}^{DL}$ is the number of cells in the second group with Rel-16 monitoring capability where $N_{cells,0,r16}^{DL} + N_{cells,1,r16}^{DL}$ is the number of configured downlink serving cells with Rel-16 PDCCH monitoring capability (per-span limit), otherwise, $N_{cells,r16}^{cap-r16}$ is the value of pdcch-BlindDetectionCA-r16.

The per-span limits M and C are applied among the component carriers designated with Rel-16 PDCCH monitoring capability.

In some embodiments, the parameters R_rel15 and R_rel16 are separately reported by the UE (possibly also separated from the parameter R used to determine $N_{cells}^{cap} = N_{cells,0}^{DL} + R \cdot N_{cells,1}^{DL}$ when UE is provided PDCCHMonitoringCapabilioConfig=R15 PDCCH monitoring capability for all DL cells).

In some embodiments, the parameter R_rel16 is equal to R_rel15. That is, a single value R is reported by the UE and is used to determine both $NN_{cells,r16}^{cap-r16}$ and $N_{cells,r16}^{cap-r16}$.

In some embodiments, the parameter R_rel15 and R_rel16 are separately defined with default values in the specification and are used if UE does not report values of R_rel15 or R_rel16.

The RRC parameters, pdcch-BlindDetectionCA-r15 and pdcch-BlindDetectionCA-r16, are optionally reported from the UE to the gNB, to indicate the number of component carriers the UE is capable of performing with Rel-15 slot-based, and Rel-16 monitoring span-based, PDCCH monitoring, respectively. The component carriers with Rel-15 monitoring are different from the component carriers with Rel-16 monitoring. Thus, the UE is capable of performing PDCCH monitoring on (pdcch-BlindDetectionCA-r15+pdcch-BlindDetectionCA-r16) carriers. The values of pdcch-BlindDetectionCA-r15 and pdcch-BlindDetectionCA-r16, may be larger than or equal to the number of carriers configured to the UE with Rel-15 PDCCH monitoring capability and Rel-16 PDCCH monitoring capability, respectively.

The following is an example of how some embodiments may be captured in a specification, such as TS 38.213, V16.0.0, Section 10.

If a UE can support a first set of $N_{cells,0}^{DL}$ serving cells where the UE is either not provided CORESETPoolIndex or is provided CORESETPoolIndex with a single value for all CORESETs on all DL BWPs of each serving cell from the first set of serving cells, and a second set of $N_{cells,1}^{DL}$ serving cells where the UE is provided CORESETPoolIndex with a value 0 for a first CORESET and with a value 1 for a second CORESET on any DL BWP of each serving cell from the second set of serving cells, then the UE determines, for the purpose of reporting pdcch-BlindDetectionCA, a number of serving cells as $N_{cells,0}^{DL}+R \cdot N_{cells,1}^{DL}$ where R is either a value reported by the UE or R may be a fixed or default value if the UE does not report a value of R.

If a UE indicates in UE-NR-Capability a carrier aggregation capability larger than 4 serving cells and the UE is not provided PDCCHMonitoringCapabilityConfig for any downlink cell or if the UE is provided PDCCHMonitoringCapabilityConfig=R15 PDCCH monitoring capability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ is the number of configured downlink serving cells, otherwise, $N_{cells}^{cap}$ is the value of pdcch-BlindDetectionCA.

If a UE can support a first set of $N_{cells,0}^{DL}$ serving cells where the UE is either not provided CORESETPoolIndex or is provided CORESETPoolIndex with a single value for all CORESETs on all DL BWPs of each serving cell from the first set of serving cells, and a second set of $N_{cells,1}^{DL}$ serving cells where the UE is provided CORESETPoolIndex with a value 0 for a first CORESET and with a value 1 for a second CORESET on any DL BWP of each serving cell from the second set of serving cells, then the UE determines, for the purpose of reporting pdcch-BlindDetectionCA-r16, a number of serving cells as $N_{cells,0}^{DL}+R\_rel16 \cdot N_{cells,1}^{DL}$ where R_rel16 is either a value reported by the UE or R_rel1 may be a fixed or default value if the UE does not report a value of R_rel16.

If a UE indicates in UE-NR-Capability-r16 a carrier aggregation capability larger than X downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than X downlink cells. When a UE is not configured for NR-DC operation and the UE is provided PDCCHMonitoringCapabilityConfig=R16 PDCCH monitoring capability for all downlink cells where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is $N_{cells,0}^{DL}+R\_rel16 \cdot N_{cells,1}^{DL}$ the number of configured downlink cells if the UE does not provide pdcch-BlindDetectionCA-r16 where $N_{cells,0}^{DL}+N_{cells,1}^{DL}$ is the number of configured downlink cells, otherwise, $N_{cells}^{cap-r16}$ is the value of pdcch-BlindDetectionCA-r16.

If a UE can support a first set of $N_{cells,0,r15}^{DL}$ serving cells where the UE is either not provided CORESETPoolIndex or is provided CORESETPoolIndex with a single value for all CORESETs on all DL BWPs of each serving cell from the first set of serving cells with Rel-15 PDCCH monitoring capability, and a second set of $N_{cells,1,r15}^{DL}$ serving cells where the UE is provided CORESETPoolIndex with a value 0 for a first CORESET and with a value 1 for a second CORESET on any DL BWP of each serving cell from the second set of serving cells with Rel-15 PDCCH monitoring capability, then the UE determines, for the purpose of reporting pdcch-BlindDetectionCA-r15, a number of serving cells as $N_{cells,0,r15}^{DL}+R\_rel15 \cdot N_{cells,1,r15}^{DL}$ where R_rel15 is either a value reported by the UE or R_rel15 is a default or fixed value if the UE does not report a value of R_rel15.

If a UE can support a first set of $N_{cells,0,r16}^{DL}$ serving cells where the UE is either not provided CORESETPoolIndex or is provided CORESETPoolIndex with a single value for all CORESETs on all DL BWPs of each serving cell from the first set of serving cells with Rel-16 PDCCH monitoring capability, and a second set of $N_{cells,0,r16}^{DL}$ serving cells where the UE is provided CORESETPoolIndex with a value 0 for a first CORESET and with a value 1 for a second CORESET on any DL BWP of each serving cell from the second set of serving cells with Rel-16 PDCCH monitoring capability, then the UE determines, for the purpose of reporting pdcch-BlindDetectionCA-r16, a number of serving cells as $N_{cells,0,r16}^{DL}+R\_rel16 \cdot N_{cells,1,r16}^{DL}$ where R_rel16 is either a value reported by the UE or R_rel16 may be a fixed or default value if the UE does not report a value of R_rel16.

If a UE indicates in UE-NR-Capability-r15 or in UE-NR-Capability-r16 a carrier aggregation capability larger than Y downlink cells or larger than Z downlink cells, respectively, the UE includes in UE-NR-Capability-r15 or in UE-NR-Capability-r16 an indication for a maximum number of PDCCH candidates and a maximum number of non-overlapped CCEs the UE can monitor for downlink cells with PDCCHMonitoringCapabilityConfig=R15 PDCCH monitoring capability or for downlink cells with PDCCHMonitoringCapabilityConfig=R16 PDCCH monitoring capability when the UE is configured for carrier aggregation operation over more than Y downlink cells or over more than Z downlink cells, respectively, and with at least one downlink cells from the Y downlink cells and at least one downlink cell from the Z downlink cells. When a UE is not configured for NR-DC operation, the UE determines a capability to monitor a maximum number of PDCCH candidates and a maximum number of non-overlapped CCEs per slot or per span that corresponds to $N_{cells,r15}^{cap-r16}$ downlink cells or to $N_{cells,r16}^{cap-r16}$ downlink cells, respectively, where $N_{cells,r15}^{cap-r16}$ is $N_{cells,0,r15}^{DL}+R\_rel15 \cdot N_{cells,1,r15}^{DL}$ the number of configured downlink cells if the UE does not provide pdcch-BlindDetectionCA-r15 where $N_{cells,0,r15}^{DL}+N_{cells,1,r15}^{DL}$ is the number of configured downlink cells with PDCCHMonitoringCapabilityConfig=R15 PDCCH monitoring capability, otherwise, $N_{cells,r15}^{cap-r16}$ is the value of pdcch-BlindDetectionCA-r15 and $-N_{cells,r16}^{cap-r16}$ is $N_{cells,0,r16}^{DL}+R\_rel16 \cdot N_{cells,1,r16}^{DL}$ the number of configured downlink cells if the UE does not provide pdcch-BlindDetectionCA-r16 where $N_{cells,0,r16}^{DL}+N_{cells,1,r16}^{DL}$ is the number of configured downlink cells with PDCCHMonitoringCapabilityConfig=R16 PDCCH monitoring capability, otherwise, $N_{cells,r16}^{cap-r16}$ is the value of pdcch-BlindDetectionCA-r16.

Some embodiments include Rel-16 PDCCH monitoring capability for the CA case with multi-TRP using CA framework. In some embodiments, a UE is configured to monitor all downlink serving cells with Rel-16 monitoring capability (per-slot limit).

The following embodiments are applicable when a UE is provided PDCCHMonitoringCapabilityConfig=R16 PDCCH monitoring capability for all downlink cells where the UE monitors PDCCH.

The following embodiments are expressed in general form where Rel-16 PDCCH monitoring capability (per span) are applicable for all SCS $\mu=0, 1, 2, 3$. In case that Rel-16 PDCCH monitoring capability are defined only on some SCS, e.g., $\mu=0$ and 1, only the parameters with $\mu=0$ and 1 are relevant and those with $\mu=2, 3$ are ignored.

In some embodiments, the UE determines the scaling factor $\gamma$ to be used to determine the number of configured cells as follows:

If a UE does not report pdcch-BlindDetectionCA-r16 or is not provided BDFactorR-r16, $\gamma=R\_rel16$ and reports pdcch-BlindDetectionCA-r16, the UE can be indicated by BDFactorR-r16 either $\gamma=1$ or $\gamma=R\_rel16$.

In some embodiments, PDCCH monitoring capability for the CA case is determined by comparing the total number of configured cells for all SCS, $\Sigma_{\mu=0}^{3}(N_{cells,0}^{DL,\mu}+\gamma \cdot N_{cells,1}^{DL,\mu})$, with the UE reported capability $N_{cells}^{cap-r16}$.

In some embodiments, PDCCH monitoring capability for the CA case (blind decode and CCE limits) for each SCS with span pattern according to span gap combination (X,Y) is determined to be the same as the single serving cell limit per span for that SCS with span pattern according to the span gap combination (X,Y) for each scheduling cell from the $N_{cells,0}^{DL,\mu}$ downlink cells if the number of configured cells for all SCS, $\Sigma_{\mu=0}^{3}(N_{cells,0}^{DL,\mu}+\gamma \cdot N_{cells,1}^{DL,\mu})$ is smaller than or equal to the UE reported capability $N_{cells}^{cap-r16}$.

In some embodiments, PDCCH monitoring capability for the CA case (blind decode and CCE limits) for each SCS with span pattern according to span gap combination (X,Y) is determined to be the single serving cell limit per span for that SCS with span pattern according to the span gap combination (X,Y) multiplied by $\gamma$ for each scheduling cell from the $N_{cells,1}^{DL,\mu}$ downlink cells if the number of configured cells for all SCS, $\Sigma_{\mu=0}^{3}(N_{cells,0}^{DL,\mu}+\gamma \cdot N_{cells,1}^{DL,\mu})$ is smaller than or equal to the UE reported capability $N_{cells}^{cap-r16}$.

In some embodiments, PDCCH monitoring capability for the CA case (blind decode and CCE limits) for each SCS with span pattern according to span gap combination (X,Y) is determined to be the same as the single serving cell limit per span for that SCS with span pattern according to the span gap combination (X,Y) for CORESETs with same CORESETPoolIndex value for each scheduled cell from the $N_{cells,1}^{DL,\mu}$ downlink cells if the number of configured cells for all SCS, $\Sigma_{\mu=0}^{3}(N_{cells,0}^{DL,\mu}+\gamma \cdot N_{cells,1}^{DL,\mu})$ is smaller than or equal to the UE reported capability $N_{cells}^{cap-r16}$.

In some embodiments, if the number of configured cells for all SCS, $\Sigma\mu=0(N_{cells,0}^{DL,\mu}+\gamma \cdot N_{cells,1}^{DL,\mu})$ is larger than the UE reported capability $N_{cells}^{cap-r16}$, PDCCH monitoring capability for the CA case is determined as follows: the maximum number of blind decodes per span for all DL cells with SCS configuration $\mu$ and span pattern according to span gap combination (X,Y) is $M_{PDCCH}^{total,(X,Y),\mu}= \lfloor N_{cells}^{cap-r16} \cdot M_{PDCCH}^{max,(X,Y),\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$, where $M_{PDCCH}^{max,(X,Y),\mu}$ is the single serving cell limit for the number of blind decode per span for SCS configuration $\mu$ and span pattern according to the span gap combination (X,Y); the maximum number of non-overlapped CCE for channel estimation per span for all DL cells with SCS configuration $\mu$ and span pattern according to span gap combination (X,Y) is $C_{PDCCH}^{total,(X,Y),\mu}= \lfloor N_{cells}^{cap-r16} \cdot C_{PDCCH}^{max,(X,Y),\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$, where $C_{PDCCH}^{max,(X,Y),\mu}$ is the single serving cell limit for the number of non-overlapped CCE per span for SCS configuration u and span pattern according to the span gap combination (X,Y).

In some embodiments, for each scheduled cell, the UE is not required to monitor on the active DL BWP with SCS configuration u of the scheduling cell from the $N_{cells,0}^{DL,\mu}$ downlink cells more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span.

In some embodiments, for each scheduled cell, the UE is not required to monitor on the active DL BWP with SCS configuration u of the scheduling cell from the $N_{cells,1}^{DL,\mu}$ downlink cells more than $\min(\gamma \cdot M_{PDCCH}^{max,(X,Y),\mu}, M_{PDCCH}^{total,(X,Y),\mu})$ PDCCH candidates or more than $\min(\gamma \cdot C_{PDCCH}^{max,(X,Y),\mu}, C_{PDCCH}^{total,(X,Y),\mu})$ non-overlapped CCEs per span, or more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span for CORESETs with same CORESETPoolIndex value.

The following is an example of how some embodiments may be captured in a specification, such as TS 38.213, V16.0.0, Section 10.

If a UE is provided PDCCHMonitoringCapabilityConfig=R16 PDCCH monitoring capability for all downlink cell where the UE monitors PDCCH, and if a UE does not report pdcch-BlindDetectionCA-r16 or is not provided BDFactorR-r16, $\gamma=R\_rel16$ and reports pdcch-BlindDetectionCA-r16, the UE can be indicated by BDFactorR-r16 either $\gamma=1$ or $\gamma=R\_rel16$.

If a UE is configured with $N_{cells,0}^{DL,\mu}+N_{cells,1}^{DL,\mu}$ downlink cells with active DL BWPs using SCS configuration $\mu$, where $\Sigma_{\mu=0}^{3}(N_{cells,0}^{DL,\mu}+\gamma \cdot N_{cells,1}^{DL,\mu}) \leq N_{cells}^{cap-r16}$, the UE is not required to monitor, on the active DL BWP of the scheduling cell, more than $M_{PDCCH}^{total,(X,Y),\mu}= M_{PDCCH}^{max,(X,Y),\mu}$ PDCCH candidates or more than $C_{PDCCH}^{total,(X,Y),\mu}= C_{PDCCH}^{max,(X,Y),\mu}$ non-overlapped CCEs per span for each scheduled cell when the scheduling cell is from the $N_{cells,0}^{DL,\mu}$ downlink cells, or more than $M_{PDCCH}^{total,(X,Y),\mu}=\gamma \cdot M_{PDCCH}^{max,(X,Y),\mu}$ PDCCH candidates or more than $C_{PDCCH}^{total,(X,Y),\mu}=\gamma \cdot C_{PDCCH}^{max,(X,Y),\mu}$ non-overlapped CCEs per span for each scheduled cell when the scheduling cell is from the $N_{cells,1}^{DL,\mu}$ downlink cells, or more than $M_{PDCCH}^{max,(X,Y),\mu}$ PDCCH candidates or more than $C_{PDCCH}^{max,(X,Y),\mu}$ non-overlapped CCEs per span for CORESETs with same CORESETPoolIndex value for each scheduled cell when the scheduling cell is from the $N_{cells,0}^{DL,\mu}$ downlink cells.

If a UE is configured with $N_{cells,0}^{DL,\mu}+N_{cells,1}^{DL,\mu}$ downlink cells with active DL BWPs using SCS configuration $\mu$, where $\Sigma_{\mu=0}^{3}(N_{cells,0}^{DL,\mu}+\gamma \cdot N_{cells,1}^{DL,\mu}) > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu}= \lfloor N_{cells}^{cap-r16} \cdot M_{PDCCH}^{max,(X,Y),\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ PDCCH candidates or more than $C_{PDCCH}^{total,(X,Y),\mu}= \lfloor N_{cells}^{cap-r16} \cdot C_{PDCCH}^{max,(X,Y),\mu} \cdot (N_{cells,0}^{DL,\mu}+\gamma \cdot N_{cells,1}^{DL,\mu})/\Sigma_{j=0}^{3}(N_{cells,0}^{DL,j}+\gamma \cdot N_{cells,1}^{DL,j}) \rfloor$ non-overlapped CCEs per span on the active DL BWP(s) of scheduling cell(s) from the $N_{cells,0}^{DL}+N_{cells,0}^{DL}$ downlink cells.

For each scheduled cell, the UE is not required to monitor on the active DL BWP with SCS configuration μ of the scheduling cell from the $N_{cells,0}^{DL,\mu}$ downlink cells more than $\min(\gamma \cdot M_{PDCCH}^{max,(X,Y),\mu}, M_{PDCCH}^{total,(X,Y),\mu})$ PDCCH candidates or more than $\min(\gamma \cdot C_{PDCCH}^{max,(X,Y),\mu}, C_{PDCCH}^{total,(X,Y),\mu})$ non-overlapped CCEs per span.

For each scheduled cell, the UE is not required to monitor on the active DL BWP with SCS configuration μ of the scheduling cell from the $N_{cells,1}^{DL,\mu}$ downlink cells more than $\min(\gamma \cdot M_{PDCCH}^{max,(X,Y),\mu}, M_{PDCCH}^{total,(X,Y),\mu})$ PDCCH candidates or more than $\min(\gamma \cdot C_{PDCCH}^{max,(X,Y),\mu}, C_{PDCCH}^{total,(X,Y),\mu})$ non-overlapped CCEs per span, or more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span for CORESETs with same CORESETPoolIndex value.

In some embodiments, a UE is configured to monitor some downlink serving cells with Rel-15 monitoring capability (per-slot limit) and some DL cells with Rel-16 monitoring capability (per-span limit).

The following embodiments are applicable when a UE is provided PDCCHMonitoringCapabilityConfig=R15 PDCCH monitoring capability for some downlink cells and PDCCHMonitoringCapabilityConfig=R16 PDCCH monitoring capability for some downlink cells where the UE monitors PDCCH.

The following embodiments are expressed in general form where Rel-16 PDCCH monitoring capability (per span) are applicable for all SCS μ=0, 1, 2, 3. In case that Rel-16 PDCCH monitoring capability are defined only on some SCS, e.g., μ=0 and 1, only the parameters with μ=0 and 1 are relevant and those with μ=2, 3 are ignored.

In some embodiments, the UE considers separately groups of downlink cells with PDCCHMonitoringCapabilityConfig=R15 PDCCH monitoring capability and PDCCHMonitoringCapabilityConfig=R16 PDCCH monitoring capability and determines the scaling factor γ_rel15 and γ_rel16 as follows:

If a UE does not report pdcch-BlindDetectionCA-r15 or is not provided BDFactorR-r15, γ_rel15=_rel15 and reports pdcch-BlindDetectionCA-r15, the UE can be indicated by BDFactorR-r15 either γ_rel15=1 or γ_rel15=R_rel15.

If a UE does not report pdcch-BlindDetectionCA-r16 or is not provided BDFactorR-r16, γ_rel16=R_rel16 and reports pdcch-BlindDetectionCA-r16, the UE can be indicated by BDFactorR-r16 either γ_rel16=1 or γ_rel16=R_rel16.

In some embodiments, BDFactorR is configured and is used instead of BDFactorR-r1.5 for the configuration related to Rel-15 monitoring capability. In some embodiments, BDFactorR is configured and is used instead of BDFactorR-r16 for the configuration related to Rel-16 monitoring capability.

In some embodiments, PDCCH monitoring capability for the CA case is determined separately for the DL cells with Rel-15 and Rel-16 monitoring capabilities.

For cells with Rel-15 capability, in some embodiments, PDCCH monitoring capability for the CA case for downlink cells with Rel-15 monitoring capability (per-slot limit) is determined by comparing the total number of configured cells with Rel-15 monitoring capability for all SCS, $\Sigma_{\mu=0}^{3}(N_{cells,0,r15}^{DL,\mu}+\gamma\_rel15 \cdot N_{cells,1,r15}^{DL,\mu})$ with the UE reported capability $N_{cells,r15}^{cap-r16}$. Here and below, γ_rel15 can be determined from BDFactorR or BDFactorR-r15 if configured or R or R_rel15.

In some embodiments, PDCCH monitoring capability for the CA case for downlink cells with Rel-15 monitoring capability and SCS configuration μ is determined to be the same as the single serving cell limit per slot for that SCS for each scheduling cell from the $N_{cells,0,r15}^{DL,\mu}$ downlink cells if the number of configured cells with Rel-15 monitoring capability for all SCS, $\Sigma_{\mu=0}^{3}(N_{cells,0,r15}^{DL,\mu}+\gamma\_rel15 \cdot N_{cells,1,r15}^{DL,\mu})$ is smaller than or equal to the UE reported capability $N_{cells,r15}^{cap-r16}$.

In one non-limiting embodiment, PDCCH monitoring capability for the CA case for DL cells with Rel-15 monitoring capability and SCS configuration μ is determined to be the single serving cell limit per slot for that SCS multiplied by γ_rel15 for each scheduling cell from the $N_{cells,1,r15}^{DL,\mu}$ downlink cells if the number of configured cells with Rel-15 monitoring capability for all SCS, $\Sigma_{\mu=0}^{3}(N_{cells,0,r15}^{DL,\mu}+\gamma\_rel15 \cdot N_{cells,1,r15}^{DL,\mu})$ is smaller than or equal to the UE reported capability $N_{cells,r15}^{cap-r16}$.

In some embodiments, PDCCH monitoring capability for the CA case for downlink cells with Rel-15 monitoring capability and SCS configuration μ is determined to be the same as the single serving cell limit per slot for that SCS for CORESETs with same CORESETPoolIndex value for each scheduled cell from the $N_{cells,1}^{DL,\mu}$ downlink cells if the number of configured cells for all SCS, $\Sigma_{\mu=0}^{3}(N_{cells,0,r15}^{DL,\mu}+\gamma\_rel15 \cdot N_{cells,1,r15}^{DL,\mu})$ is smaller than or equal to the UE reported capability $N_{cells,r15}^{cap-r16}$.

In some embodiments, if the number of configured cells with Rel-15 monitoring capability for all SCS, $\Sigma_{\mu=0}^{3}(N_{cells,0,r15}^{DL,\mu}+\gamma\_rel15 \cdot N_{cells,1,r15}^{DL,\mu})$ is larger than the UE reported capability $N_{cells,r15}^{cap-r16}$, PDCCH monitoring capability for the CA case for cells with Rel-15 monitoring capability is determined as follows: the maximum number of blind decodes per slot for all DL cells with Rel-15 monitoring capability and SCS configuration μ is $M_{PDCCH}^{total,slot,\mu}=\lfloor N_{cells-r15}^{cap-r16} \cdot M_{PDCCH}^{max,slot,\mu} \cdot (N_{cells,0,r15}^{DL,\mu}+\gamma \cdot N_{cells,1,r15}^{DL,\mu})/\Sigma_{j=0}^{3}(N_{cells,0,r15}^{DL,j}+\gamma \cdot N_{cells,1,r15}^{DL,j})\rfloor$, where $M_{PDCCH}^{total,slot,\mu}$ is the single serving cell limit for the number of blind decode per slot for SCS configuration μ; the maximum number of non-overlapped CCE for channel estimation per slot for all DL cells with Rel-15 monitoring capability and SCS configuration μ is $C_{PDCCH}^{total,slot,\mu}=\lfloor N_{cells-r15}^{cap-r16} \cdot C_{PDCCH}^{max,slot,\mu} \cdot (N_{cells,0,r15}^{DL,\mu}+\gamma \cdot N_{cells,1,r15}^{DL,\mu})/\Sigma_{j=0}^{3}(N_{cells,0,r15}^{DL,j}+\gamma \cdot N_{cells,1,r15}^{DL,j})\rfloor$, where $C_{PDCCH}^{max,slot,\mu}$ is the single serving cell limit for the number of non-overlapped CCE per slot for SCS configuration μ.

In some embodiments, for each scheduled cell, the UE is not required to monitor on the active DL BWP with SCS configuration μ of the scheduling cell from the $N_{cells,0,r15}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

In some embodiments, for each scheduled cell, the UE is not required to monitor on the active downlink BWP with SCS configuration μ of the scheduling cell from the $N_{cells,1,r15}^{DL,\mu}$ downlink cells more than $\min(\gamma\_rel15 \cdot M_{PDCCH}^{max,slot,\mu}, M_{PDCCH}^{total,slot,\mu})$ PDCCH candidates or more than $\min(\gamma\_rel15 \cdot C_{PDCCH}^{max,slot,\mu}, C_{PDCCH}^{total,slot,\mu})$ non-overlapped CCEs per slot, or more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value.

For cells with Rel-16 capability, in some embodiments, PDCCH monitoring capability for the CA case for downlink cells with Rel-16 monitoring capability (per-span limit) is determined by comparing the total number of configured cells with Rel-16 monitoring capability for all SCS, $\Sigma_{\mu=0}^{3} (N_{cells,0,r16}^{DL,\mu} + \gamma\_rel16 \cdot N_{cells,1,r16}^{DL,\mu})$ with the UE reported capability $N_{cells,r16}^{cap-r16}$. Here and below, $\gamma\_rel16$ can be determined from BDFactorR or BDFactorR-r16 if configured or R or R_rel16.

In some embodiments, PDCCH monitoring capability for the CA case for downlink cells with Rel-16 monitoring capability for each SCS with span pattern according to span gap combination (X,Y) is determined to be the same as the single serving cell limit per span for that SCS with span pattern according to the span gap combination (X,Y) for each scheduling cell from the $N_{cells,1,r15}^{DL,\mu}$ downlink cells if the number of configured cells for all SCS, $\Sigma_{\mu=0}^{3} (N_{cells,0,r16}^{DL,\mu} + \gamma\_rel16 \cdot N_{cells,1,r16}^{DL,\mu})$ is smaller than or equal to the UE reported capability $N_{cells,r16}^{cap-r16}$.

In some embodiments, PDCCH monitoring capability for the CA case for downlink cells with Rel-16 monitoring capability for each SCS with span pattern according to span gap combination (X,Y) is determined to be the single serving cell limit per span for that SCS with span pattern according to the span gap combination (X,Y) multiplied by $\gamma\_rel16$ for each scheduling cell from the $N_{cells,1,r16}^{DL,\mu}$ downlink cells if the number of configured cells for all SCS, $\Sigma_{\mu=0}^{3} (N_{cells,0,r16}^{DL,\mu} + \gamma\_rel16 \cdot N_{cells,1,r16}^{DL,\mu})$ is smaller than or equal to the UE reported capability $N_{cells,r16}^{cap-r16}$.

In some embodiments, PDCCH monitoring capability for the CA case for downlink cells with Rel-16 monitoring capability for each SCS with span pattern according to span gap combination (X,Y) is determined to be the same as the single serving cell limit per span for that SCS with span pattern according to the span gap combination (X,Y) for CORESETs with same CORESETPoolIndex value for each scheduled cell from the $N_{cells,1,r16}^{DL,\mu}$ downlink cells if the number of configured cells for all SCS, $\Sigma_{\mu=0}^{3} (N_{cells,0,r16}^{DL,\mu} + \gamma\text{-rel16} \cdot N_{cells,1,r16}^{DL,\mu})$ is smaller than or equal to the UE reported capability $N_{cells,r16}^{cap-r16}$.

In some embodiments, if the number of configured cells with Rel-16 monitoring capability for all SCS, $\Sigma_{\mu=0}^{3} (N_{cells,0,r16}^{DL,\mu} + \gamma\_rel16 \cdot N_{cells,1,r16}^{DL,\mu})$ is larger than the UE reported capability $N_{cells,r16}^{cap-r16}$, PDCCH monitoring capability for the CA case for downlink cells with Rel-16 monitoring capability is determined as follows: the maximum number of blind decodes per span for all DL cells with Rel-16 monitoring capability and SCS configuration $\mu$ and span pattern according to span gap combination (X,Y) is $M_{PDCCH}^{total,(X,Y),\mu} = \lfloor N_{cells}^{cap-r16} \cdot M_{PDCCH}^{max,(X,Y),\mu} \cdot (N_{cells,0}^{DL,\mu} + \gamma \cdot N_{cells,1}^{DL,\mu}) / \Sigma_{j=0}^{3} (N_{cells,0}^{DL,j} + \gamma \cdot N_{cells,1}^{DL,j}) \rfloor$, where $M_{PDCCH}^{max,(X,Y),\mu}$ is the single serving cell limit for the number of blind decode per span for SCS configuration $\mu$ and span pattern according to the span gap combination (X,Y); the maximum number of non-overlapped CCE for channel estimation per span for all DL cells with Rel-16 monitoring capability and SCS configuration $\mu$ and span pattern according to span gap combination (X,Y) is $C_{PDCCH}^{total,(X,Y),\mu} = \lfloor N_{cells,r16}^{cap-r16} \cdot C_{PDCCH}^{max,(X,Y),\mu} \cdot (N_{cells,0,r16}^{DL,\mu} + \gamma \cdot N_{cells,1,r16}^{DL,\mu}) / \Sigma_{j=0}^{3} (N_{cells,0,r16}^{DL,j} + \gamma\_rel16 \cdot N_{cells,1}^{DL,j}) \rfloor$, where $C_{PDCCH}^{max,(X,Y),\mu}$ is the single serving cell limit for the number of non-overlapped CCE per span for SCS configuration u and span pattern according to the span gap combination (X,Y).

In some embodiments, for each scheduled cell, the UE is not required to monitor on the active DL BWP with SCS configuration u of the scheduling cell from the $N_{cells,0,r16}^{DL,\mu}$ downlink cells more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span.

In some embodiments, for each scheduled cell, the UE is not required to monitor on the active DL BWP with SCS configuration u of the scheduling cell from the $N_{cells,1,r16}^{DL,\mu}$ downlink cells more than $\min(\gamma\_rel16 \cdot M_{PDCCH}^{max,(X,Y),\mu}, M_{PDCCH}^{total,(X,Y),\mu})$ PDCCH candidates or more than $\min(\gamma\_rel16 \cdot C_{PDCCH}^{max,(X,Y),\mu}, C_{PDCCH}^{total,(X,Y),\mu})$ non-overlapped CCEs per span, or more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span for CORESETs with same CORESETPoolIndex value.

The following is an example of how some embodiments may be captured in a specification, such as TS 38.213, V16.0.0, Section 10.

If a UE is provided PDCCHMonitoringCapabilityConfig=R15 PDCCH monitoring capability for some downlink cell and PDCCHMonitoringCapabilityConfig=R16 PDCCH monitoring capability for some downlink cell where the UE monitors PDCCH, the UE considers separately groups of downlink cells with PDCCHMonitoringCapabilityConfig=R15 PDCCH monitoring capability and PDCCHMonitoringCapabilityConfig=R16 PDCCH monitoring capability.

If a UE—does not report pdcch-BlindDetectionCA-r15 or is not provided BDFactorR_r15, $\gamma\_rel15 = R\_rel15$ and reports pdcch-BlindDetectionCA-r15, the UE can be indicated by BDFactorR_r15 either $\gamma\_rel15=1$ or $\gamma\_rel15=R\_rel15$.

If a UE is configured with $N_{cells,0,r15}^{DL,\mu} + N_{cells,1,r15}^{DL,\mu}$ downlink cells with active DL BWPs using SCS configuration $\mu$, where $\Sigma_{\mu=0}^{3} (N_{cells,0,r15}^{DL,\mu} + \gamma\_rel15 \cdot N_{cells,1,r15}^{DL,\mu}) \leq N_{cells,r15}^{cap-r16}$, the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell when the scheduling cell is from the $N_{cells,0,r15}^{DL,\mu}$ downlink cells, or more than $M_{PDCCH}^{total,slot,\mu} = \gamma\_rel15 \cdot M_{PDCCH}^{max,slot,\mu}$ PDCCH candidates or more than $C_{PDCCH}^{total,slot,\mu} = \gamma\_rel15 \cdot C_{PDCCH}^{max,slot,\mu}$ non-overlapped CCEs per slot for each scheduled cell when the scheduling cell is from the $N_{cells,1,r15}^{DL,\mu}$ downlink cells, or more than $M_{PDCCH}^{max,slot,\mu}$ PDCCH candidates or more than $C_{PDCCH}^{max,slot,\mu}$ non-overlapped CCEs per slot for CORESETs with same CORESETPoolIndex value for each scheduled cell when the scheduling cell is from the $N_{cells,1,r15}^{DL,\mu}$ downlink cells.

If a UE is configured with $N_{cells,0,r15}^{DL,\mu} + N_{cells,1,r15}^{DL,\mu}$ downlink cells with active DL BWPs using SCS configuration $\mu$, where $\Sigma_{\mu=0}^{3} (N_{cells,0,r15}^{DL,\mu} + \gamma\_rel15 \cdot N_{cells,1,r15}^{DL,\mu}) > N_{cells,r15}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu} = \lfloor N_{cells-r15}^{cap-r16} \cdot M_{PDCCH}^{max,slot,\mu} \cdot (N_{cells,0,r15}^{DL,\mu} + \gamma \cdot N_{cells,1,r15}^{DL,\mu})/\Sigma_{j=0}^{3}(N_{cells,0,r15}^{DL,j} + \gamma \cdot N_{cells,1,r15}^{DL,j})\rfloor$ PDCCH candidates or more than $C_{PDCCH}^{total,slot,\mu} = \lfloor N_{cells-r15}^{cap-r16} \cdot C_{PDCCH}^{max,slot,\mu} \cdot (N_{cells,0,r15}^{DL,\mu} + \gamma \cdot N_{cells,1,r15}^{DL,\mu})/\Sigma_{j=0}^{3}(N_{cells,0,r15}^{DL,j} + \gamma \cdot N_{cells,1,r15}^{DL,j})\rfloor$ non-overlapped CCEs per slot on the active DL BWP(s) of scheduling cell(s) from the $N_{cells,0,r15}^{DL,\mu} + N_{cells,1,r15}^{DL,\mu}$ downlink cells.

For each scheduled cell, the UE is not required to monitor on the active DL BWP with SCS configuration μ of the scheduling cell from the $N_{cells,0,r15}^{DL,\mu}$ downlink cells more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

For each scheduled cell, the UE is not required to monitor on the active DL BWP with SCS configuration μ of the scheduling cell from the $N_{cells,1,r15}^{DL,\mu}$ downlink cells more than $\min(\gamma\_rel15 \cdot M_{PDCCH}^{max,slot,\mu}, M_{PDCCH}^{total,slot,\mu})$ PDCCH candidates or more than $\min(\gamma\_rel15 \cdot C_{PDCCH}^{max,slot,\mu}, C_{PDCCH}^{total,slot,\mu})$ non-overlapped CCEs per slot, or more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot for CORESETs with same CORESETPoolIndex value.

If a UE does not report pdcch-BlindDetectionCA-r16 or is not provided BDFactorR-r16, $\gamma\_rel16=R\_rel16$ and reports pdcch-BlindDetectionCA-r16, the UE can be indicated by BDFactorR-r16 either $\gamma\_rel16=1$ or $\gamma\_rel16=R\_rel16$.

If a UE is configured with $N_{cells,0,r16}^{DL,\mu} + N_{cells,1,r16}^{DL,\mu}$ downlink cells with active DL BWPs using SCS configuration μ, where $\Sigma_{\mu=0}^{3}(N_{cells,0,r16}^{DL,\mu} + \gamma\_rel16 \cdot N_{cells,1,r16}^{DL,\mu}) \le N_{cells,r16}^{cap-r16}$, the UE is not required to monitor, on the active DL BWP of the scheduling cell, more than $M_{PDCCH}^{total,(X,Y),\mu} = M_{PDCCH}^{max,(X,Y),\mu}$ PDCCH candidates or more than $C_{PDCCH}^{total,(X,Y),\mu} = C_{PDCCH}^{max,(X,Y),\mu}$ non-overlapped CCEs per span for each scheduled cell when the scheduling cell is from the $N_{cells,0,r16}^{DL,\mu}$ downlink cells, or more than $M_{PDCCH}^{total,(X,Y),\mu} = \gamma\_rel16 \cdot M_{PDCCH}^{max,(X,Y),\mu}$ PDCCH candidates or more than $C_{PDCCH}^{total,(X,Y),\mu} = \gamma\_rel16 \cdot C_{PDCCH}^{max,(X,Y),\mu}$ non-overlapped CCEs per for each scheduled cell when the scheduling cell is from the $N_{cells,1,r16}^{DL,\mu}$ downlink cells, or more than $M_{PDCCH}^{max,(X,Y),\mu}$ PDCCH candidates or more than $C_{PDCCH}^{max,(X,Y),\mu}$ non-overlapped CCEs per span for CORESETs with same CORESETPoolIndex value for each scheduled cell when the scheduling cell is from the $N_{cells,1,r16}^{DL,\mu}$ downlink cells.

If a UE is configured with $N_{cells,0,r16}^{DL,\mu} + N_{cells,1,r16}^{DL,\mu}$ downlink cells with active DL BWPs using SCS configuration μ, where $\Sigma_{\mu=0}^{3}(N_{cells,0,r16}^{DL,\mu} + \gamma\_rel16 \cdot N_{cells,1,r16}^{DL,\mu}) > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,(X,Y),\mu} = \lfloor N_{cells,r16}^{cap-r16} \cdot M_{PDCCH}^{max,(X,Y),\mu} \cdot (N_{cells,0,r16}^{DL,(X,Y)\mu} + \gamma\_rel16 \cdot N_{cells,1,r16}^{DL,(X,Y)\mu})/\Sigma_{j=0}^{3}(N_{cells,0,r16}^{DL,j} + \gamma\_rel16 \cdot N_{cells,1,r16}^{DL,j})\rfloor$ PDCCH candidates or more than $C_{PDCCH}^{total,(X,Y),\mu} = \lfloor N_{cells,r16}^{cap-r16} \cdot C_{PDCCH}^{max,(X,Y),\mu} \cdot (N_{cells,0,r16}^{DL,(X,Y)\mu} + \gamma\_rel16 \cdot N_{cells,1,r16}^{DL,(X,Y)\mu})/\Sigma_{j=0}^{3}(N_{cells,0,r16}^{DL,j} + \gamma\_rel16 \cdot N_{cells,1,r16}^{DL,j})\rfloor$ non-overlapped CCEs per span on the active DL BWP(s) of scheduling cell(s) from the $N_{cells,0,r16}^{DL,\mu} + N_{cells,1,r16}^{DL,\mu}$ downlink cells.

For each scheduled cell, the UE is not required to monitor on the active DL BWP with SCS configuration μ of the scheduling cell from the $N_{cells,0,r16}^{DL,\mu}$ downlink cells more than $\min(M_{PDCCH}^{max,(X,Y),\mu}, M_{PDCCH}^{total,(X,Y),\mu})$ PDCCH candidates or more than $\min(C_{PDCCH}^{max,(X,Y),\mu}, C_{PDCCH}^{total,(X,Y),\mu})$ non-overlapped CCEs per span.

For each scheduled cell, the UE is not required to monitor on the active DL BWP with SCS configuration μ of the scheduling cell from the $N_{cells,1,r16}^{DL,\mu}$ downlink cells more than $\min(\gamma\_rel16 \cdot M_{PDCCH}^{max,(X,Y),\mu}, M_{PDCCH}^{total,(X,Y),\mu})$ PDCCH candidates or more than $\min(\gamma\_rel16 \cdot C_{PDCCH}^{max,(X,Y),\mu}, C_{PDCCH}^{total,(X,Y),\mu})$ PDCCH non-overlapped CCEs per span, or more than $\min(M_{PDCCH}^{max,(X,Y),\mu}, M_{PDCCH}^{total,(X,Y),\mu})$ PDCCH candidates or more than $\min(M_{PDCCH}^{max,(X,Y),\mu}, M_{PDCCH}^{total,(X,Y),\mu})$ non-overlapped CCEs per span for CORESETs with same CORESETPoolIndex value.

Some embodiments include a restriction on PDCCH monitoring capability on each TRP. In some embodiments, only either Rel-15 monitoring capability or Rel-16 monitoring capability is allowed on each TRP. That is, the UE is either configured with $N_{cells,0,r15}^{DL,\mu}$ DL cells with Rel-15 monitoring capability for the first set of serving cells and $N_{cells,1,r16}^{DL,\mu}$ DL cells with Rel-16 monitoring capability for the second set of serving cells, or configured with $N_{cells,0,r16}^{DL,\mu}$ DL cells with Rel-16 monitoring capability for the first set of serving cells and $N_{cells,1,r15}^{DL,\mu}$ DL cells with Rel-15 monitoring capability for the second set of serving cells.

Some embodiments include PDCCH overbooking and dropping. As described, at each monitoring span, the UE is not expected to monitor more than the maximum CCE and maximum blind decoding candidates. Thus, the UE performs PDCCH dropping at each monitoring occasion if the total amount of PDCCH CCE or blind decoding candidates exceed the calculated limits.

In some embodiments, the UE starts PDCCH monitoring with the PDCCH candidates with the largest allowable CCE, then sequentially move to PDCCH candidates of smaller and smaller allowable CCE.

In some embodiments, the UE starts PDCCH monitoring with the PDCCH candidates with the smallest allowable CCE, then sequentially move to PDCCH candidates of larger and larger allowable CCE.

PDCCH dropping rules according to above embodiments where PDCCH dropping is performed at each monitoring occasion until the blind decode or CCE limit is exceeded may be considered as partial candidate dropping as some candidates in a search space can be monitored and some are dropped.

Other alternative rules are such that the dropping is applied to all candidates in a search space. For example, PDCCH dropping is performed per span on a search space level. The order of search space monitoring can be, e.g.: CSS first, and then USS with lowest search space index first, followed by USS with higher and higher search space index sequentially. After the total number of blind decodes or monitored CCEs exceeds their limits, respectively, when attempting detection of a given search space, all candidate of that search space and of all search space with higher indices are dropped.

In some embodiments, if there is only one search space configured in a monitoring span, PDCCH dropping for the span is performed at each monitoring occasion; otherwise PDCCH dropping for a span is performed on a search space level. That is, if there is only one search space in a span, some candidates in the search space are monitored and some can be dropped if the total number of blind decodes or monitored CCEs exceeds the calculated span limit. If there are more than one search spaces configured in a monitoring span, all candidate in the search space including search spaces with higher indices are dropped once the total number of blind decodes or monitored CCEs exceeds the span limits.

In some embodiments, PDCCH dropping is performed per slot instead of per span if the total limit (i.e., sum of span limits over all non-empty spans in a slot) is less than the slot limit. Here the non-empty span refers to a monitoring span derived as part of the span pattern in a slot where there is at least one PDCCH candidate configured for UE to monitor. In some embodiments, the dropping is performed at each monitoring occasion in a slot. In another version, the dropping is performed on a search space level.

Figure 2:
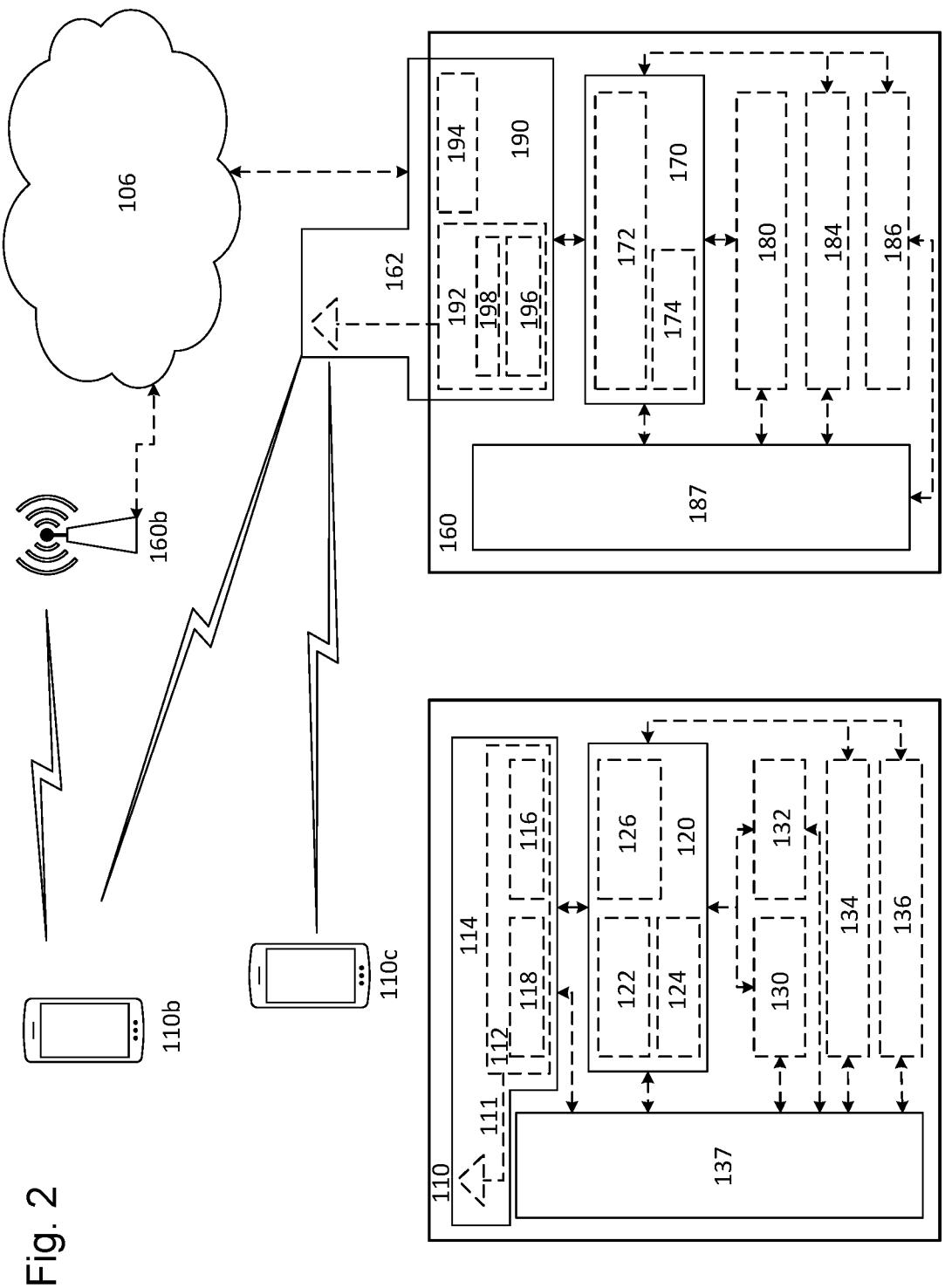
FIG. 2 is a block diagram illustrating an example wireless network.

FIG. 2 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 3:
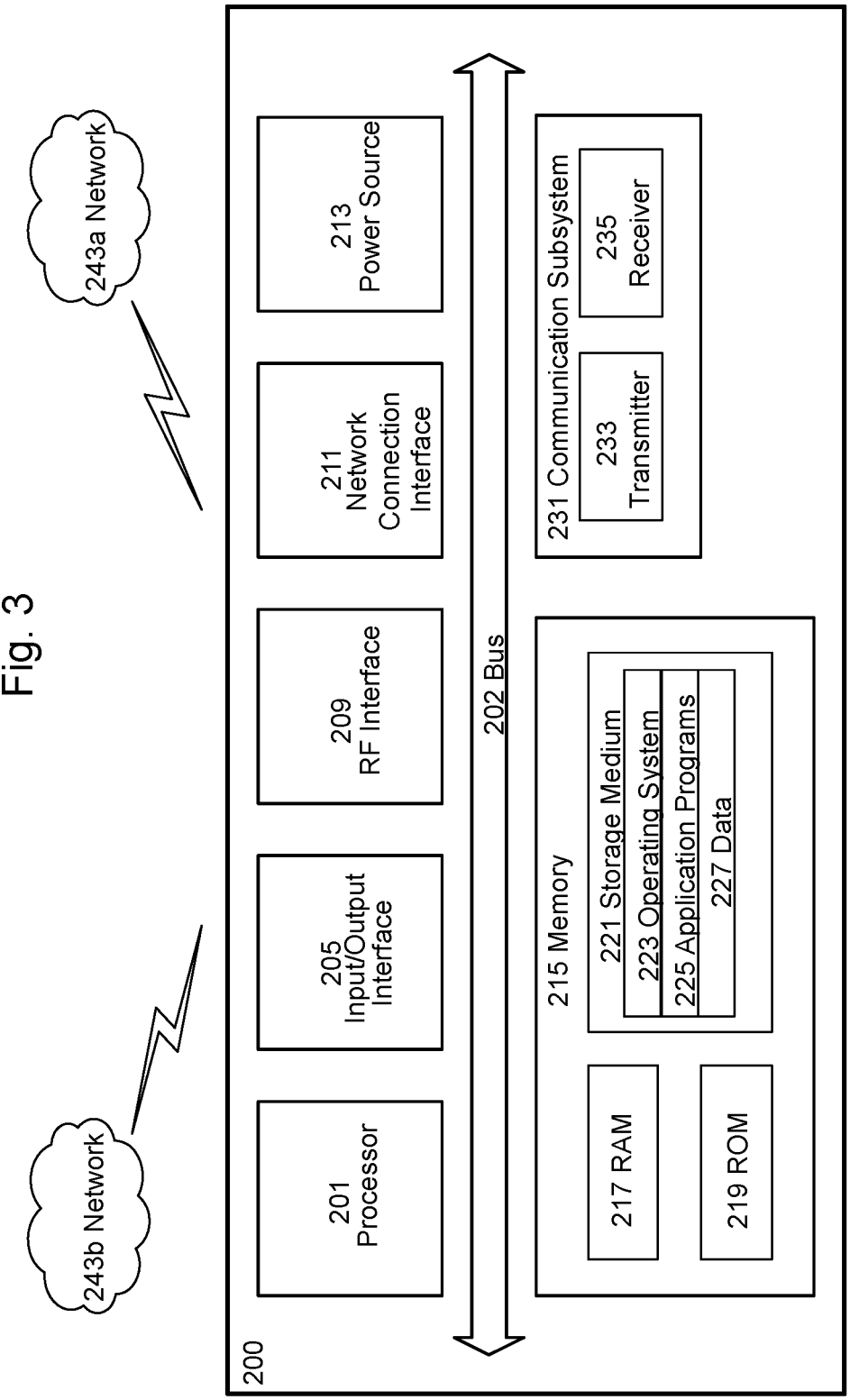
FIG. 3 illustrates an example user equipment, according to certain embodiments.

FIG. 3 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 3, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 3, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 4:
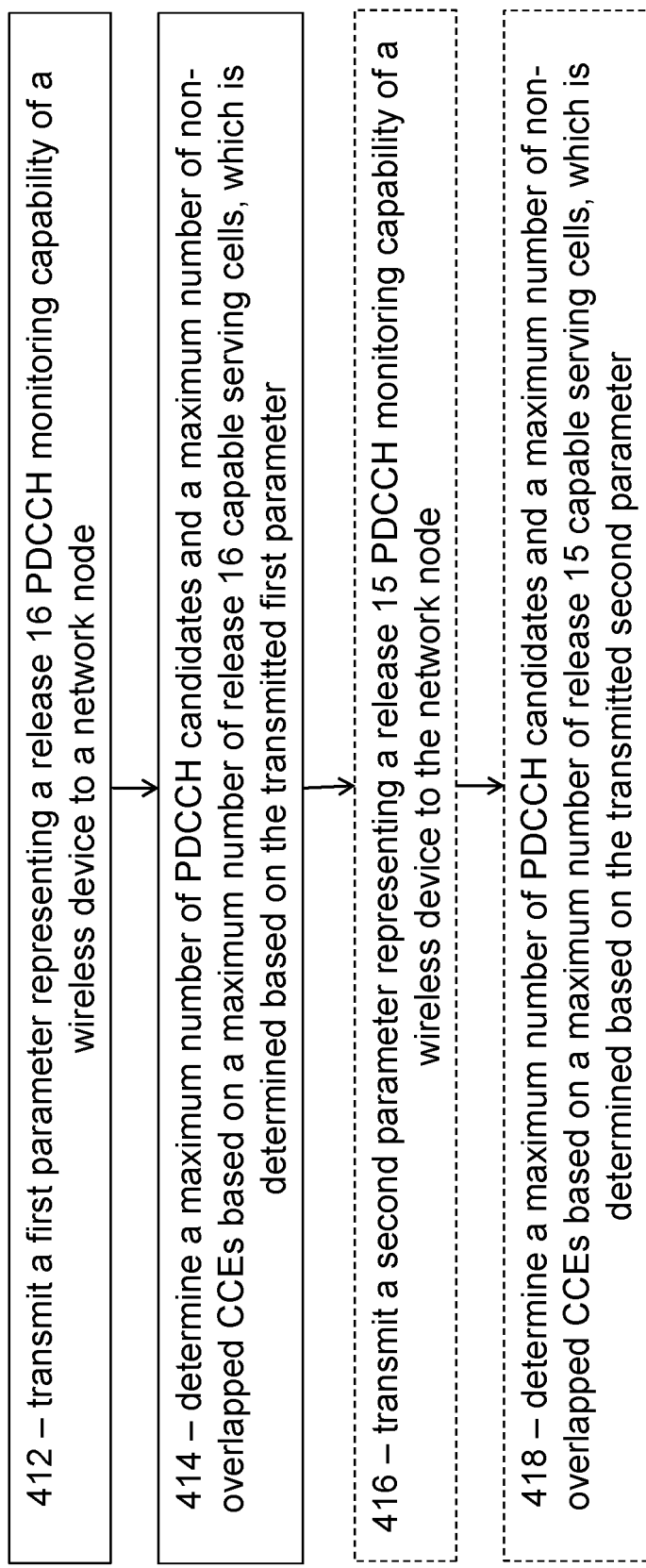
FIG. 4 is flowchart illustrating an example method in a wireless device, according to certain embodiments.

FIG. 4 is a flowchart illustrating an example method in a wireless device, according to certain embodiments. In particular embodiments, one or more steps of FIG. 4 may be performed by wireless device 110 described with respect to FIG. 2. The wireless device is capable of operating in communication with two or more serving cells (e.g., carrier aggregation) wherein at least one serving cell of the two or more serving cells is configured for release 16 reporting of PDCCH monitoring capabilities.

The method begins at step 412, where the wireless device (e.g., wireless device 110) transmits a first parameter representing a release 16 PDCCH monitoring capability of the wireless device to a network node.

In particular embodiments, the transmitted first parameter comprises the maximum number of release 16 capable serving cells (e.g., pdcch-BlindDetectionCA-r16). In other embodiments, the two or more serving cells comprise a first subset of serving cells (e.g., $N_{cells,0}^{DL}$) and a second subset of serving cells (e.g., $N_{cells,1}^{DL}$), the first transmitted parameter comprises a first ratio (e.g., R_rel16), and the maximum number of release 16 capable serving cells (e.g., $N_{cells}^{cap-r16}$) equals a number of serving cells in the first subset combined with a number of serving cells in the second subset scaled by the first ratio (e.g., $N_{cells}^{cap-r16} = N_{cells,0}^{DL} + R\_rel16 \cdot N_{cells,1}^{DL}$).

In particular embodiments, the first subset of serving cells comprises serving cells where the wireless device is either not provided a CORESET pool index or is provided a CORESET pool index with a single value for all CORESETs on all downlink bandwidth parts of each serving cell in the first subset of serving cells, and the second subset of serving cells comprises serving cells where the wireless device is provided a CORESET pool index with a value 0 for a first CORESET and with a value 1 for a second CORESET on any downlink bandwidth part of each serving cell from the second subset of serving cells.

At step 414, the wireless device determines a maximum number of PDCCH candidates and a maximum number of non-overlapped CCEs based on a maximum number of release 16 capable serving cells, which is determined based on the transmitted first parameter.

In particular embodiments, the total number of the two or more serving cells is less than or equal to the maximum number of release 16 capable serving cells and the maximum number of PDCCH candidates and the maximum number of non-overlapped CCEs is the same as a single serving cell limit per span for each of the two or more serving cells.

In particular embodiments, the total number of the two or more serving cells is less than or equal to the maximum number of release 16 capable serving cells and the maximum number of PDCCH candidates and the maximum number of non-overlapped CCEs is based on a single serving cell limit per span for each of the two or more serving cells.

In particular embodiments, the total number of the two or more serving cells is greater than the maximum number of release 16 capable serving cells and the maximum number of PDCCH candidates and the maximum number of non-overlapped CCEs is based on a single serving cell limit per span for each of the two or more serving cells.

In particular embodiments, the total number of the two or more serving cells is modified based on the first parameter (e.g., scaling factor γ).

In particular embodiments, the wireless device determines a maximum number of PDCCH candidates and a maximum number of non-overlapped CCEs according to any of the embodiments and examples described herein.

Some networks may include cells configured for release 16 reporting of PDCCH monitoring capabilities and release 15 reporting of PDCCH monitoring capabilities. In such cases, the method may continue to step 416.

At step 416, the wireless device may transmit a second parameter representing a release 15 PDCCH monitoring capability of the wireless device to the network node.

In particular embodiments, the transmitted second parameter comprises the maximum number of release 15 capable serving cells (e.g., BlindDetectionCA-r15). In other embodiments, the two or more serving cells comprise a first subset of serving cells and a second subset of serving cells; the second transmitted parameter comprises a second ratio (e.g., R_rel15); and the maximum number of release 15 capable serving cells equals a number of serving cells in the first subset combined with a number of serving cells in the second subset scaled by the second ratio (e.g., $N_{cells,r15}^{cap-r16} = N_{cells,0,r15}^{DL} + R\_rel15 \cdot N_{cells,1,r15}^{DL}$).

At step 418, the wireless device determines a maximum number of PDCCH candidates and a maximum number of non-overlapped CCEs based on a maximum number of release 15 capable serving cells, which is determined based on the transmitted second parameter.

In particular embodiments, determining the maximum number of PDCCH candidates and the maximum number of non-overlapped CCEs for release 16 capable cells is based on comparing a total number of the two or more serving cells configured for release 16 reporting with the maximum number of release 16 capable serving cells and determining the maximum number of PDCCH candidates and the maximum number of non-overlapped CCEs for release 15 capable cells is based on comparing a total number of the two or more serving cells configured for release 15 reporting with the maximum number of release 15 capable serving cells.

Modifications, additions, or omissions may be made to method 400 of FIG. 4. Additionally, one or more steps in the method of FIG. 4 may be performed in parallel or in any suitable order. For example, although steps 412 and 416 are illustrated separately for ease of explanation, the first and second parameters may be transmitted to the network node at the same time.

Figure 5:
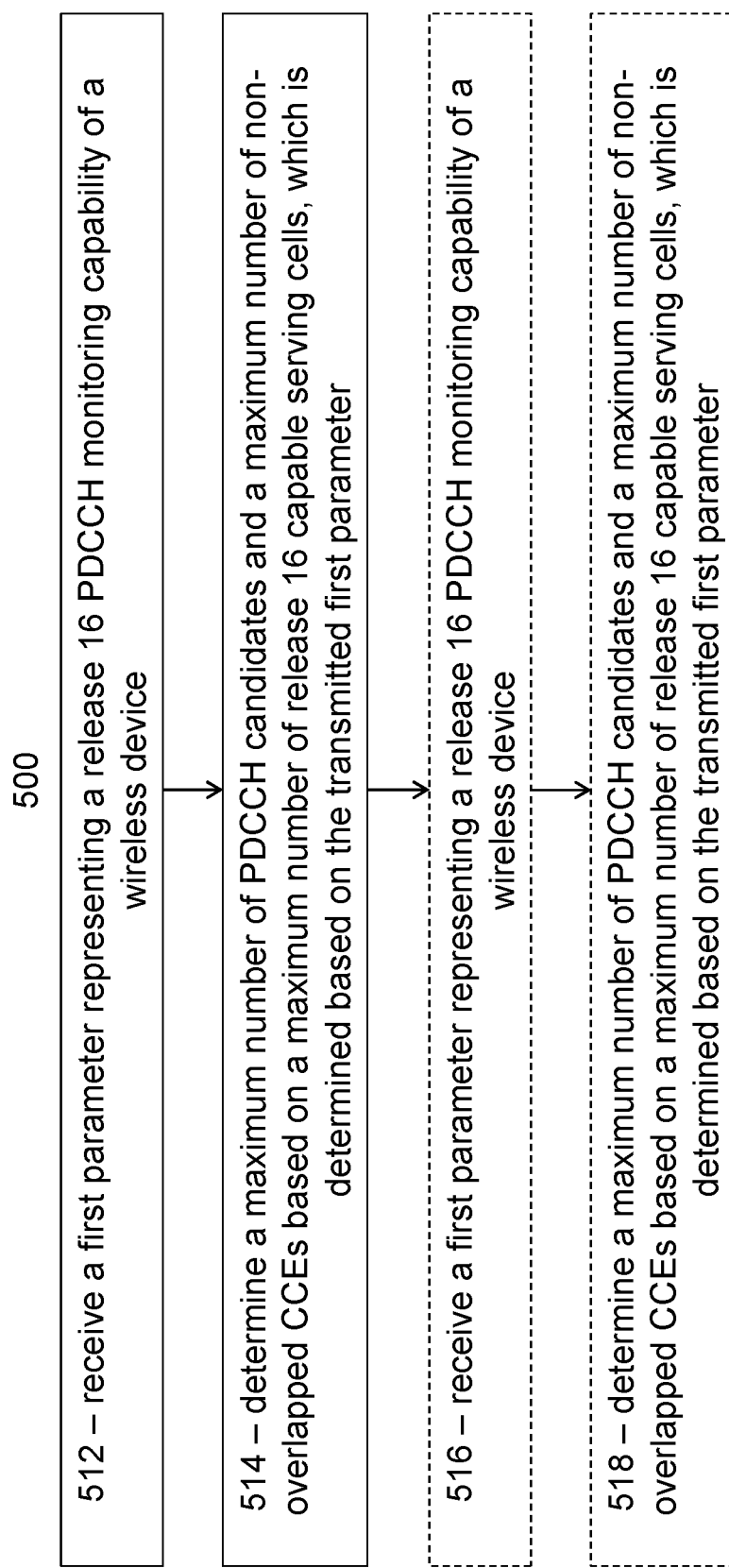
FIG. 5 is flowchart illustrating an example method in a network node, according to certain embodiments.

FIG. 5 is a flowchart illustrating an example method in a network node, according to certain embodiments. In particular embodiments, one or more steps of FIG. 5 may be performed by network node 160 described with respect to FIG. 2. The network node is capable of receiving PDCCH monitoring capabilities of a wireless device. The wireless device is operating in communication with two or more serving cells and at least one serving cell of the two or more serving cells is configured for release 16 reporting of monitoring capabilities. The method begins at step 512, where the network node (e.g., network node 160) receives a first parameter representing a release 16 PDCCH monitoring capability of the wireless device. The parameter is the same parameter described with respect to step 412 of FIG. 4.

At step 514, the network node determines a maximum number of PDCCH candidates and a maximum number of non-overlapped CCEs based on a maximum number of release 16 capable serving cells, which is determined based on the transmitted first parameter. The network node may determine the maximum number of PDCCH candidates and a maximum number of non-overlapped CCEs according to any of the embodiments and examples described herein.

If the network includes cells configured for release 16 reporting of PDCCH monitoring capabilities and release 15 reporting of PDCCH monitoring capabilities, the method may continue to step 516.

At step 516, the network node receives a second parameter representing a release 15 PDCCH monitoring capability of the wireless device to the network node. The second parameter is described with respect to step 416 of FIG. 4.

At step 518, the network node determines a maximum number of PDCCH candidates and a maximum number of non-overlapped CCEs based on a maximum number of release 15 capable serving cells, which is determined based on the transmitted second parameter.

The network node determines the maximum number of PDCCH candidates and the maximum number of non-overlapped CCEs according to any of the embodiments and examples described herein.

Modifications, additions, or omissions may be made to method 500 of FIG. 5. Additionally, one or more steps in the method of FIG. 5 may be performed in parallel or in any suitable order. For example, although steps 512 and 516 are illustrated separately for ease of explanation, the first and second parameters may be received from the wireless device at the same time.

FIG. 6 illustrates a schematic block diagram of two apparatuses in a wireless network (for example, the wireless network illustrated in FIG. 2). The apparatuses include a wireless device and a network node (e.g., wireless device 110 and network node 160 illustrated in FIG. 2). Apparatuses 1600 and 1700 are operable to carry out the example methods described with reference to FIGS. 5 and 4, respectively, and possibly any other processes or methods disclosed herein. It is also to be understood that the methods of FIGS. 4 and 5 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to determining module 1604, transmitting module 1606, and any other suitable units of apparatus 1600 to perform corresponding functions according one or more embodiments of the present disclosure. Similarly, the processing circuitry described above may be used to cause receiving module 1702, transmitting module 1706, and any other suitable units of apparatus 1700 to perform corresponding functions according one or more embodiments of the present disclosure.

As illustrated in FIG. 6, apparatus 1600 includes determining module 1604 configured to determine PDCCH monitoring capabilities according to any of the embodiments and examples described herein. Transmitting module 1606 is configured to report wireless device capabilities according to any of the embodiments and examples described herein.

As illustrated in FIG. 6, apparatus 1700 includes receiving module 1702 configured to receive PDCCH monitoring capabilities according to any of the embodiments and examples described herein. Transmitting module 1706 is configured to transmit a PDCCH to a wireless device, according to any of the embodiments and examples described herein.

Figure 7:
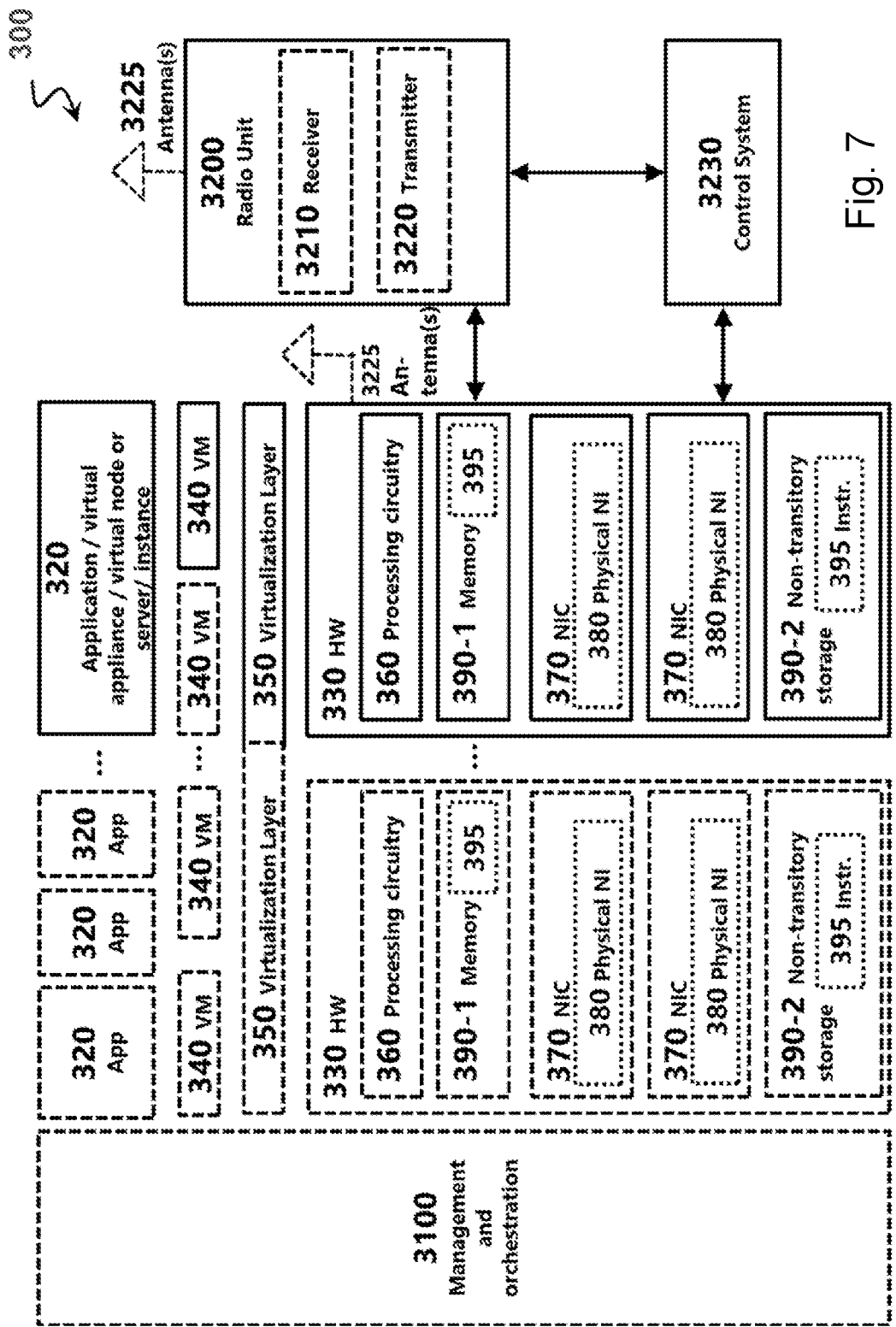
FIG. 7 illustrates an example virtualization environment, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 8:
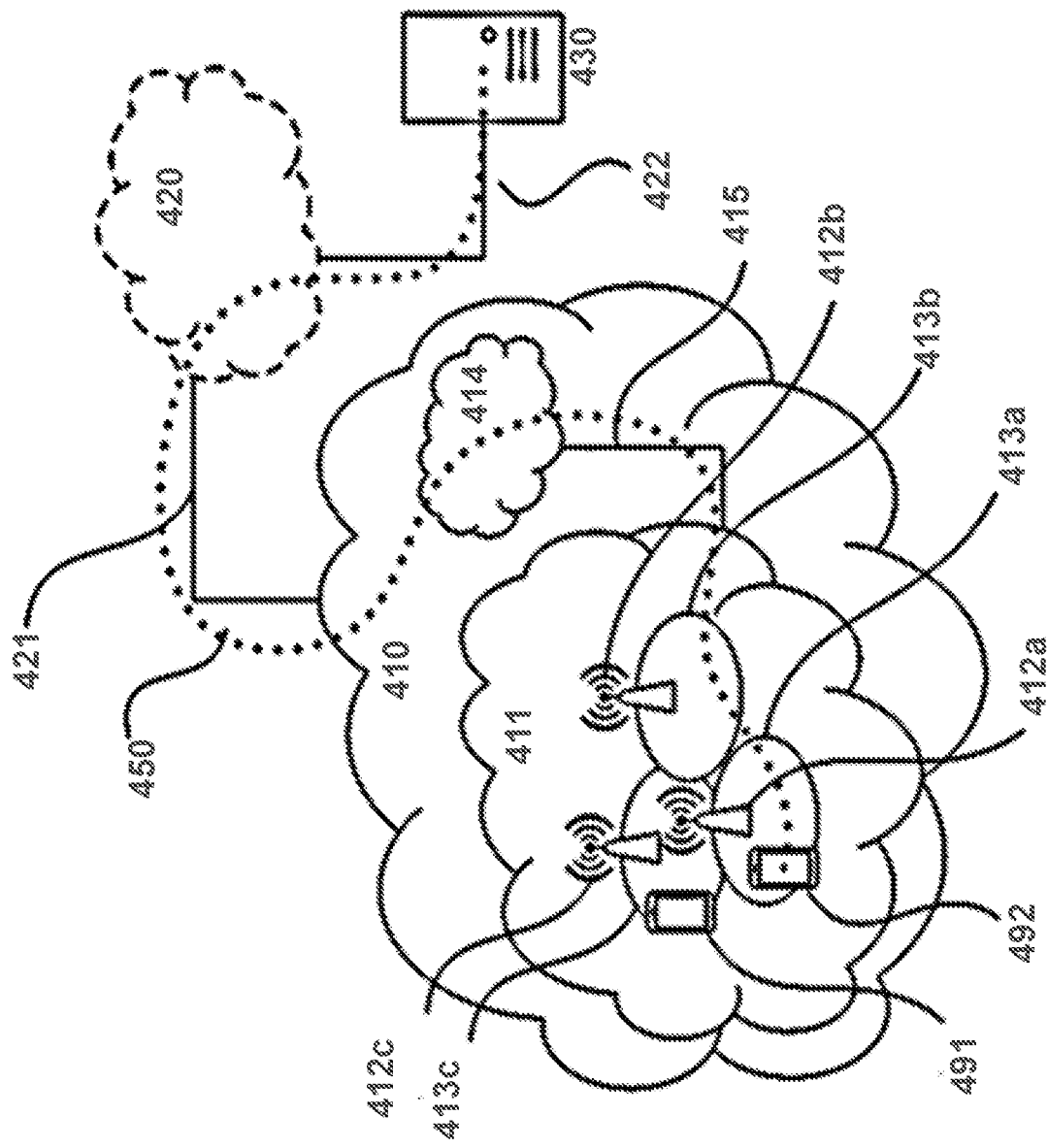
FIG. 8 illustrates an example telecommunication network connected via an intermediate network to a host computer, according to certain embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past muting of an incoming downlink communication with data originating from host computer 430 to be forwarded (e.g., handed over) to a connected UE 491. Similarly, base station 412 need not be aware of the future muting of an outgoing uplink communication originating from the UE 491 towards the host computer 430.

Figure 9:
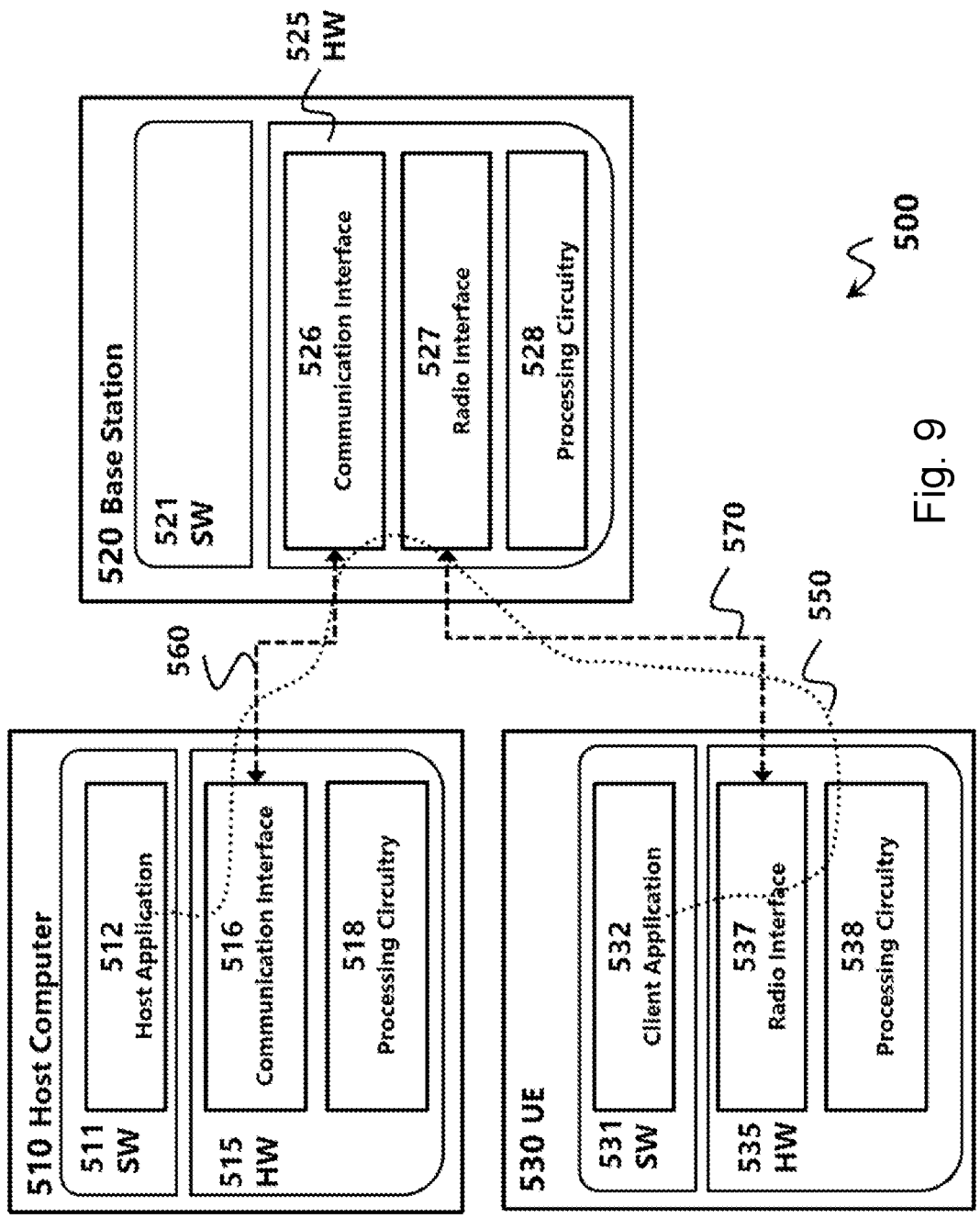
FIG. 9 illustrates an example host computer communicating via a base station with a user equipment over a partially wireless connection, according to certain embodiments.

FIG. 9 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct, or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 7, respectively. This is to say, the inner workings of these entities may be as shown in FIG. 9 and independently, the surrounding network topology may be that of FIG. 7.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the muting (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred muting etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
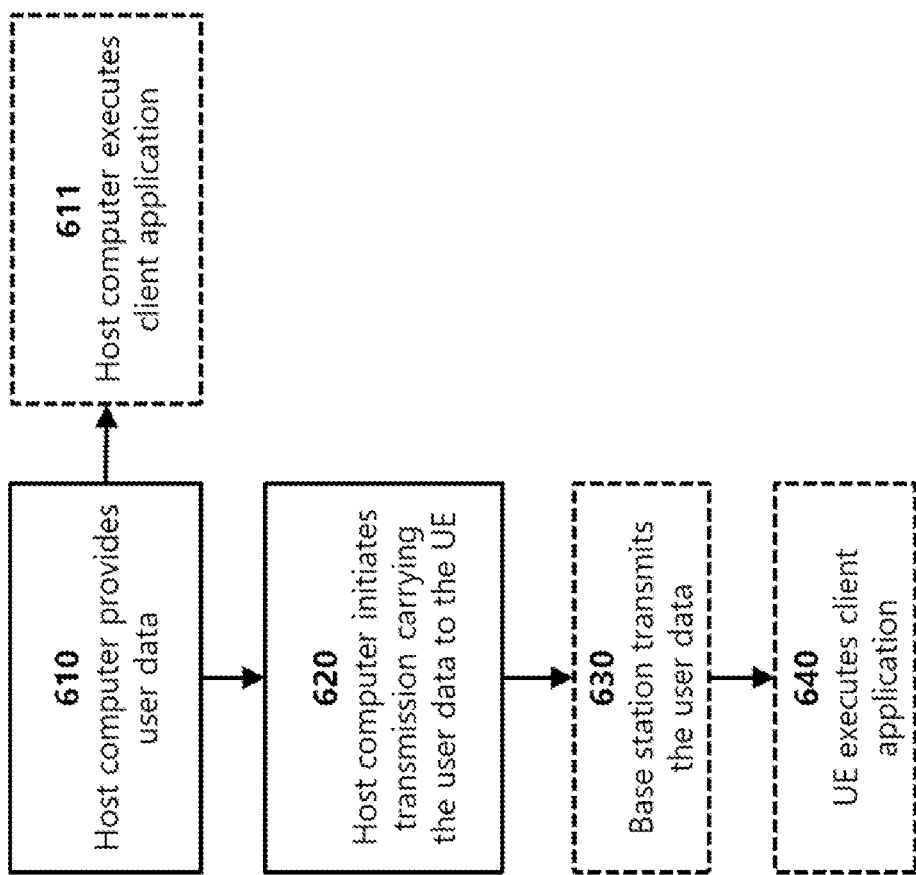
FIG. 10 is a flowchart illustrating a method implemented, according to certain embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
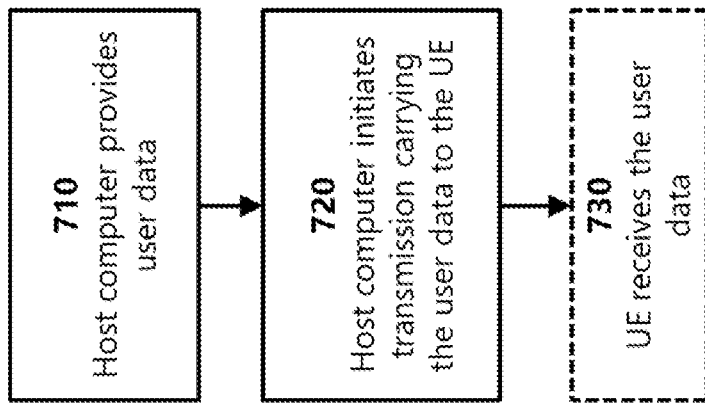
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
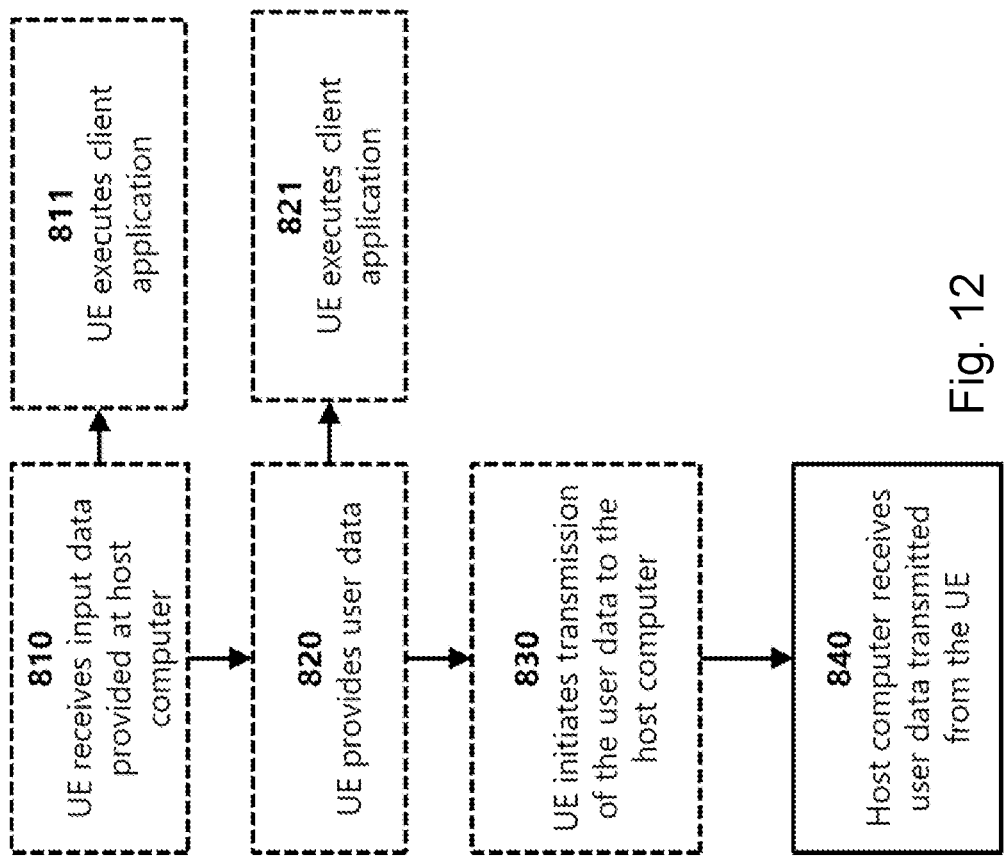
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
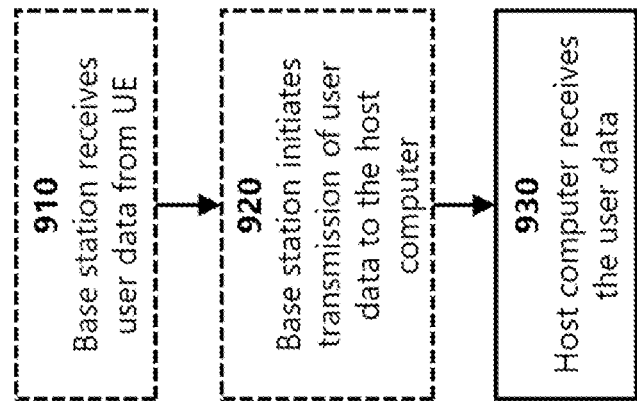
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACK/NACK Acknowledgment/Non-acknowledgment
ARQ Automatic Repeat Request
AWGN Additive White Gaussian Noise
BCCH Broadcast Control Channel
BCH Broadcast Channel
BLER Block Error Rate
CA Carrier Aggregation
CC Carrier Component
CCE Control Channel Element
CCCH SDU Common Control Channel SDU
CDMA Code Division Multiplexing Access
CORESET Control Resource Set
CQI Channel Quality information
CSI Channel State Information
DCCH Dedicated Control Channel
DCI Downlink Control Information
DFTS-OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HSPA High Speed Packet Access
HRPD High Rate Packet Data
LOS Line of Sight
LPP LTE Positioning Protocol
LTE Long-Term Evolution
MAC Medium Access Control
MCS Modulation and Coding Scheme
MIB Master Information Block
MME Mobility Management Entity
MSC Mobile Switching Center
NR New Radio
OFDM Orthogonal Frequency Division Multiplexing
OFDMA Orthogonal Frequency Division Multiple Access
PCell Primary Cell
PCFICH Physical Control Format Indicator Channel
PDCCH Physical Downlink Control Channel
PDSCH Physical Downlink Shared Channel
PGW Packet Gateway
PHICH Physical Hybrid-ARQ Indicator Channel PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SPS Semi-Persistent Scheduling
SUL Supplemental Uplink
SS Synchronization Signal
SSS Secondary Synchronization Signal
TDD Time Division Duplex
TRP Transmission Reception Point
TTI Transmission Time Interval
UE User Equipment
UL Uplink
URLLC Ultra-Reliable and Low-Latency Communications
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for physical downlink control channel (PDCCH) monitoring, wherein the wireless device is operating in communication with two or more serving cells and wherein at least one serving cell of the two or more serving cells is configured for release 16 reporting of monitoring capabilities, the method comprising:
   transmitting a first parameter representing a release 16 PDCCH monitoring capability of the wireless device to a network node, wherein the first parameter comprises or is used to determine a maximum number of release 16 capable serving cells; and
   determining a maximum number of PDCCH candidates and a maximum number of non-overlapped control channel elements (CCEs) based on the maximum number of release 16 capable serving cells.

2. A wireless device capable of reporting physical downlink control channel (PDCCH) monitoring capabilities of the wireless device, wherein the wireless device is capable of operating in communication with two or more serving cells and wherein at least one serving cell of the two or more serving cells is configured for release 16 reporting of monitoring capabilities, the wireless device comprising processing circuitry operable to:
   transmit a first parameter representing a release 16 PDCCH monitoring capability of the wireless device to a network node, wherein the first parameter comprises or is used to determine a maximum number of release 16 capable serving cells; and
   determine a maximum number of PDCCH candidates and a maximum number of non-overlapped control channel elements (CCEs) based on the maximum number of release 16 capable serving cells.

3. The wireless device of claim 2, wherein:
   the two or more serving cells comprise a first subset of serving cells and a second subset of serving cells;
   the first transmitted parameter comprises a first ratio; and
   the maximum number of release 16 capable serving cells equals a number of serving cells in the first subset combined with a number of serving cells in the second subset scaled by the first ratio.

4. The wireless device of claim 3, wherein the first subset of serving cells comprises serving cells where the wireless device is either not provided a control resource set (CORESET) pool index or is provided a CORESET pool index with a single value for all CORESETs on all downlink bandwidth parts of each serving cell in the first subset of serving cells, and the second subset of serving cells comprises serving cells where the wireless device is provided a CORESET pool index with a value 0 for a first CORESET and with a value 1 for a second CORESET on any downlink bandwidth part of each serving cell from the second subset of serving cells.

5. The wireless device of claim 2, wherein all of the two or more serving cells are configured for release 16 reporting of monitoring capabilities, and wherein determining the maximum number of PDCCH candidates and the maximum number of non-overlapped CCEs is based on comparing a total number of the two or more serving cells with the maximum number of release 16 capable serving cells.

6. The wireless device of claim 5, wherein the total number of the two or more serving cells is less than or equal to the maximum number of release 16 capable serving cells and the maximum number of PDCCH candidates and the maximum number of non-overlapped CCEs is the same as a single serving cell limit per span for each of the two or more serving cells.

7. The wireless device of claim 5, wherein the total number of the two or more serving cells is less than or equal to the maximum number of release 16 capable serving cells and the maximum number of PDCCH candidates and the maximum number of non-overlapped CCEs is based on a single serving cell limit per span for each of the two or more serving cells.

8. The wireless device of claim 5, wherein the total number of the two or more serving cells is greater than the maximum number of release 16 capable serving cells and the maximum number of PDCCH candidates and the maximum number of non-overlapped CCEs is based on a single serving cell limit per span for each of the two or more serving cells.

9. The wireless device of claim 5, wherein the total number of the two or more serving cells is modified based on the first parameter.

10. The wireless device of claim 2, wherein at least one serving cell of the two or more serving cells is configured for release 15 reporting of monitoring capabilities, the processing circuitry further operable to:
transmit a second parameter representing a release 15 PDCCH monitoring capability of the wireless device to the network node; and
determine a maximum number of PDCCH candidates and a maximum number of non-overlapped control channel elements (CCEs) based on a maximum number of release 15 capable serving cells, which is determined based on the transmitted second parameter.

11. The wireless device of claim 10, wherein the transmitted second parameter comprises the maximum number of release 15 capable serving cells.

12. The wireless device of claim 10, wherein:
the two or more serving cells comprise a first subset of serving cells and a second subset of serving cells;
the second transmitted parameter comprises a second ratio; and
the maximum number of release 15 capable serving cells equals a number of serving cells in the first subset combined with a number of serving cells in the second subset scaled by the second ratio.

13. The wireless device of claim 10, wherein the processing circuitry is operable to determine the maximum number of PDCCH candidates and the maximum number of non-overlapped CCEs for release 16 capable cells based on comparing a total number of the two or more serving cells configured for release 16 reporting with the maximum number of release 16 capable serving cells and determining the maximum number of PDCCH candidates and the maximum number of non-overlapped CCEs for release 15 capable cells is based on comparing a total number of the two or more serving cells configured for release 15 reporting with the maximum number of release 15 capable serving cells.

14. The wireless device of claim 10, wherein the first subset of serving cells includes all release 16 capable cells or all release 15 capable cells and the second subset of serving cells includes all release 16 capable cells or all release 15 capable cells.

15. A method performed by a network node capable of receiving physical downlink control channel (PDCCH) monitoring capabilities of a wireless device, wherein the wireless device is operating in communication with two or more serving cells and wherein at least one serving cell of the two or more serving cells is configured for release 16 reporting of monitoring capabilities, the method comprising:
receiving a first parameter representing a release 16 PDCCH monitoring capability of the wireless device, wherein the first parameter comprises or is used to determine a maximum number of release 16 capable serving cells; and
determining a maximum number of PDCCH candidates and a maximum number of non-overlapped control channel elements (CCEs) based on the maximum number of release 16 capable serving cells.

16. A network node capable of receiving physical downlink control channel (PDCCH) monitoring capabilities of a wireless device, wherein the wireless device is operating in communication with two or more serving cells and wherein at least one serving cell of the two or more serving cells is configured for release 16 reporting of monitoring capabilities, the network node comprising processing circuitry operable to:
receive a first parameter representing a release 16 PDCCH monitoring capability of the wireless device, wherein the first parameter comprises or is used to determine a maximum number of release 16 capable serving cells; and
determine a maximum number of PDCCH candidates and a maximum number of non-overlapped control channel elements (CCEs) based on the maximum number of release 16 capable serving cells.

17. The network node of claim 16, wherein:
the two or more serving cells comprise a first subset of serving cells and a second subset of serving cells;
the first received parameter comprises a first ratio; and
the maximum number of release 16 capable serving cells equals a number of serving cells in the first subset combined with a number of serving cells in the second subset scaled by the first ratio.

18. The network node of claim 17, wherein the first subset of serving cells comprises serving cells where the wireless device is either not provided a control resource set (CORESET) pool index or is provided a CORESET pool index with a single value for all CORESETs on all downlink bandwidth parts of each serving cell in the first subset of serving cells, and the second subset of serving cells comprises serving cells where the wireless device is provided a CORESET pool index with a value 0 for a first CORESET and with a value 1 for a second CORESET on any downlink bandwidth part of each serving cell from the second subset of serving cells.

19. The network node of claim 16, wherein all of the two or more serving cells are configured for release 16 reporting of monitoring capabilities, and wherein determining the maximum number of PDCCH candidates and the maximum number of non-overlapped CCEs is based on comparing a total number of the two or more serving cells with the maximum number of release 16 capable serving cells.

20. The network node of claim 19, wherein the total number of the two or more serving cells is less than or equal to the maximum number of release 16 capable serving cells and the maximum number of PDCCH candidates and the maximum number of non-overlapped CCEs is the same as a single serving cell limit per span for each of the two or more serving cells.

21. The network node of claim 19, wherein the total number of the two or more serving cells is less than or equal to the maximum number of release 16 capable serving cells and the maximum number of PDCCH candidates and the maximum number of non-overlapped CCEs is based on a single serving cell limit per span for each of the two or more serving cells.

22. The network node of claim 19, wherein the total number of the two or more serving cells is greater than the maximum number of release 16 capable serving cells and the maximum number of PDCCH candidates and the maximum number of non-overlapped CCEs is based on a single serving cell limit per span for each of the two or more serving cells.

23. The network node of claim 16, wherein at least one serving cell of the two or more serving cells is configured for release 15 reporting of monitoring capabilities, the processing circuitry further operable to:
receive a second parameter representing a release 15 PDCCH monitoring capability of the wireless device to the network node; and determine a maximum number of PDCCH candidates and a maximum number of non-overlapped control channel elements (CCEs) based on a maximum number of release 15 capable serving cells, which is determined based on the transmitted second parameter.

24. The network node of claim 23, wherein the received second parameter comprises the maximum number of release 15 capable serving cells.

* * * * *